United States Patent
Otsuka et al.

(10) Patent No.: US 9,235,357 B2
(45) Date of Patent: Jan. 12, 2016

(54) INFORMATION PROCESSING APPARATUS, CONTROL METHOD THEREOF, AND COMPUTER-READABLE MEDIUM

(71) Applicant: CANON KABUSHIKI KAISHA, Tokyo (JP)

(72) Inventors: Koichiro Otsuka, Kawasaki (JP); Kenichiro Uotani, Ichikawa (JP); Atsuko Koike, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 13/649,406

(22) Filed: Oct. 11, 2012

(65) Prior Publication Data
US 2013/0100493 A1    Apr. 25, 2013

(30) Foreign Application Priority Data
Oct. 21, 2011  (JP) .................. 2011-232124

(51) Int. Cl.
  *G06F 3/12*   (2006.01)
  *G06K 15/00*  (2006.01)

(52) U.S. Cl.
  CPC ............. *G06F 3/12* (2013.01); *G06F 3/1207* (2013.01); *G06F 3/1234* (2013.01); *G06F 3/1288* (2013.01); *G06F 3/1259* (2013.01)

(58) Field of Classification Search
  USPC ....................................... 358/1.15
  See application file for complete search history.

(56) References Cited

U.S. PATENT DOCUMENTS

| | | | |
|---|---|---|---|
| 2003/0151766 A1* | 8/2003 | Clough et al. | 358/1.15 |
| 2005/0078165 A1* | 4/2005 | Harada et al. | 347/137 |
| 2005/0174595 A1* | 8/2005 | Walpus et al. | 358/1.14 |
| 2006/0136871 A1* | 6/2006 | O'Connor et al. | 717/113 |
| 2006/0262344 A1* | 11/2006 | Matsuda | 358/1.15 |
| 2008/0055636 A1* | 3/2008 | Namikata | 358/1.15 |
| 2008/0239383 A1* | 10/2008 | Okajima | 358/1.15 |
| 2008/0259387 A1* | 10/2008 | Hirai | 358/1.15 |
| 2009/0086267 A1* | 4/2009 | Sato | 358/1.15 |
| 2012/0188594 A1* | 7/2012 | Jessen et al. | 358/1.15 |
| 2012/0212771 A1* | 8/2012 | Goddard et al. | 358/1.15 |

FOREIGN PATENT DOCUMENTS

| | | |
|---|---|---|
| JP | 03-224778 A | 10/1991 |
| JP | H11-095957 | 4/1999 |
| JP | H11-134146 A | 5/1999 |
| JP | 2006-504182 A | 2/2006 |

OTHER PUBLICATIONS

Japanese Office Action issued in corresponding application No. 2011232124 on Oct. 5, 2015.

* cited by examiner

*Primary Examiner* — Huo Long Chen
(74) *Attorney, Agent, or Firm* — Carter, DeLuca, Farrell & Schmidt, LLP

(57) ABSTRACT

An information processing apparatus which transfers a print job to a lower apparatus that is included in a print system and located at a lower level in print processing, comprises: a determination unit configured to determine whether to cancel the print job; and a cancel command issuing unit configured, when the determination unit determines to cancel processing for the print job, to issue, to the lower apparatus for the print job, a cancel command to which information about a cancel reason is added.

11 Claims, 21 Drawing Sheets

F I G. 1
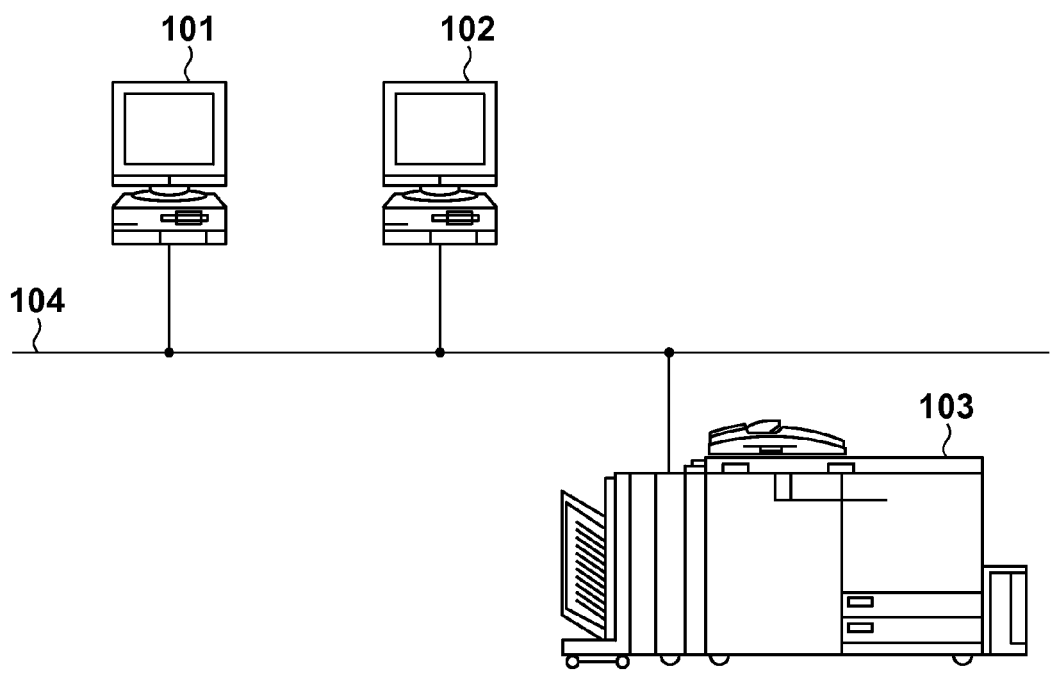

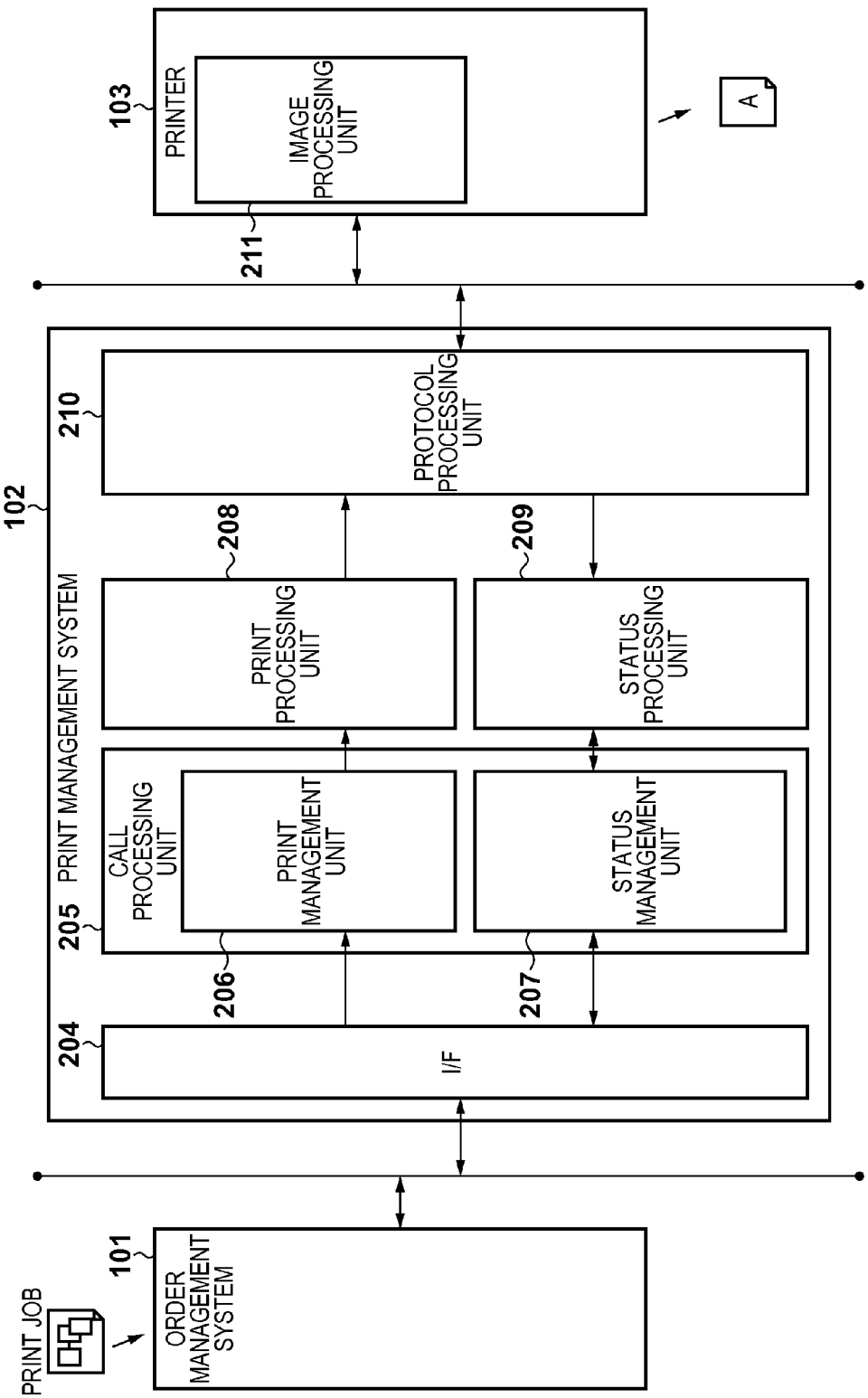

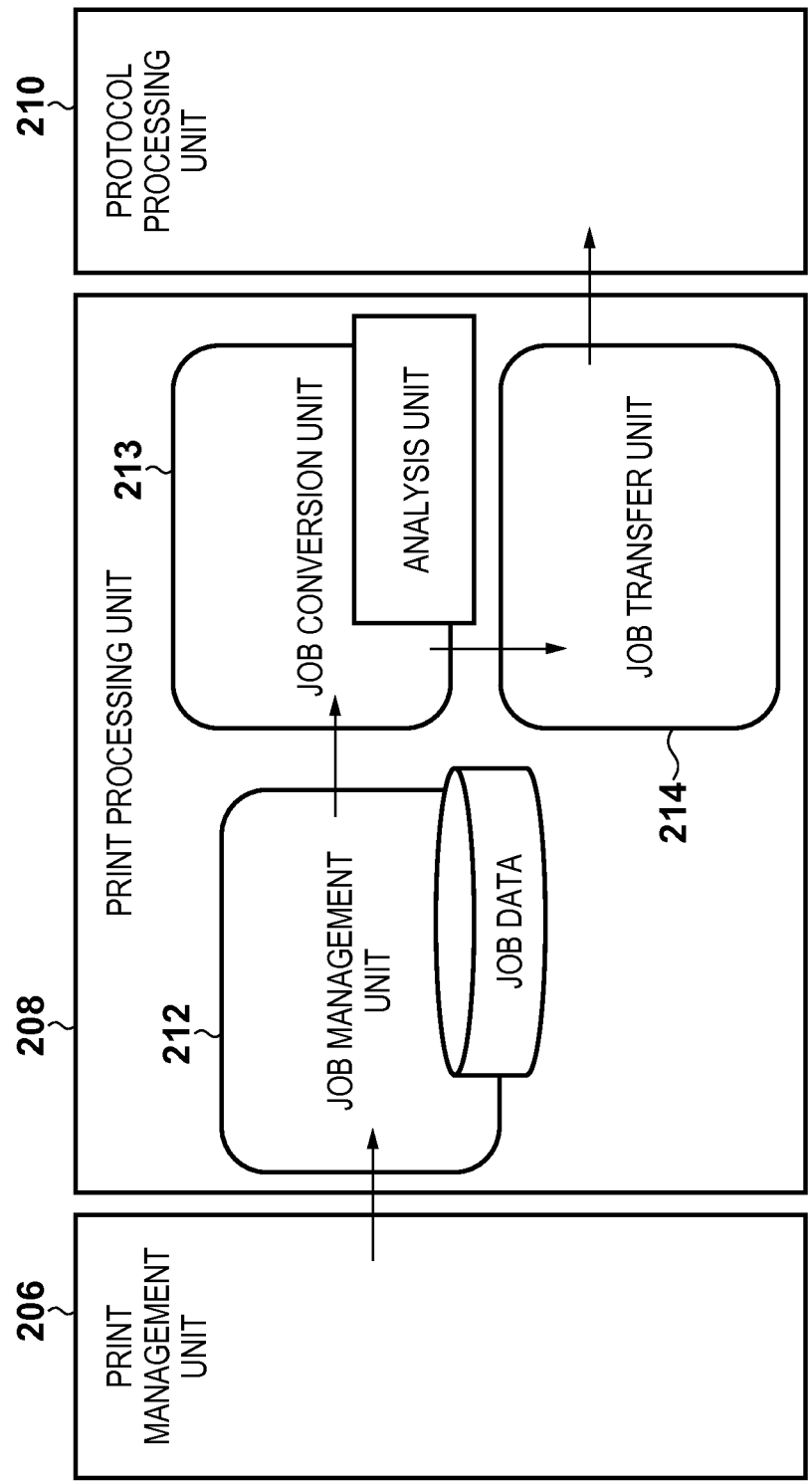

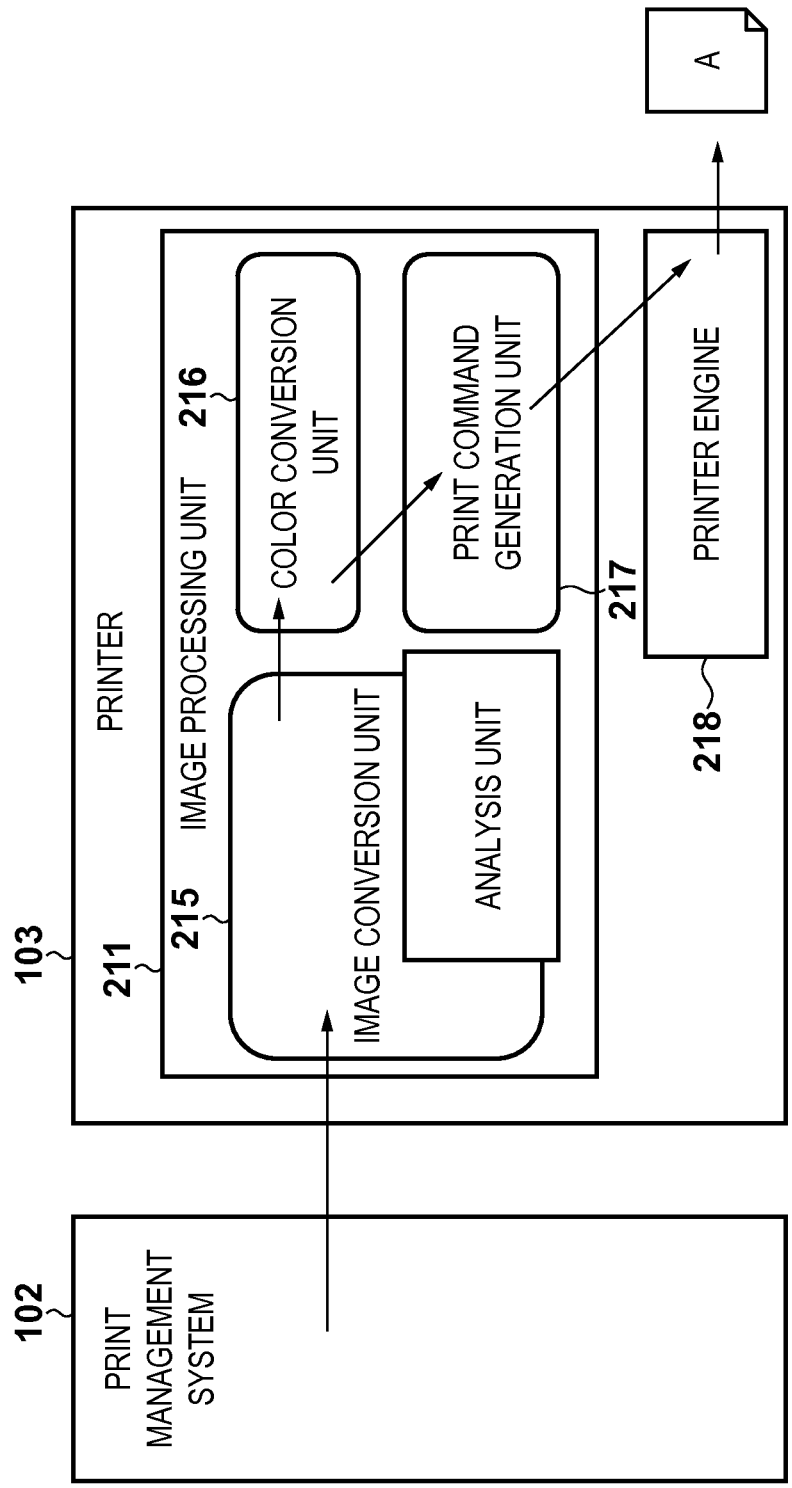

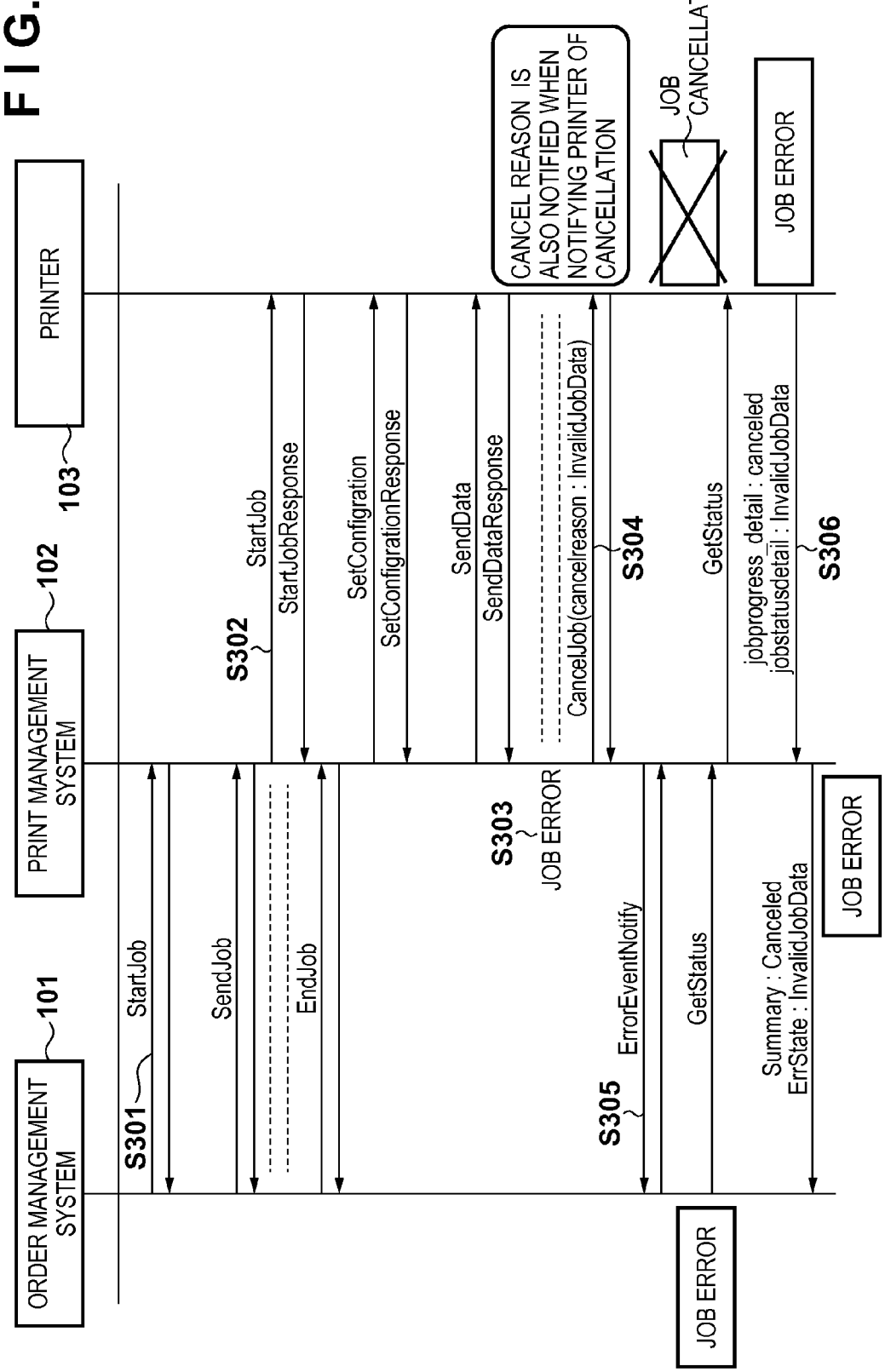

FIG. 4A

```
<?xml version=""1.0"" encoding=""UTF-8""?>
<xmlns:vcn2=""http://www.oanon.com/ns/cmd/2010/01/oanon/""
xmlns:ikw=""http://www.oanon.com/ns/cmd/2010/05/oanon/"">
<contents>
  <operation>ikw:CancelJob</operation>
  <param_set servicetype=""ikw:print"">
    <vcn2:jobInfo jobID=""00000001"">
    <vcn2:cancelmode>ikw:normal</vcn2:cancelmode>
    <vcn2:cancelreason>ikw:InvalidJobData</vcn2:cancelreason> ←PRINT JOB IMPROPRIETY
    </vcn2:jobInfo>
  </param_set>
 </contents>
</cmd>
```

FIG. 4B

| <cancelreason> | <jobstatusdetail> |
|---|---|
| InvalidJobData | InvalidJobData |
| InvalidContentsData | InvalidContentsData |
| InvalidPrintSetting | InvalidPrintSetting |
| user | user |
| none | none |

FIG. 4C

```
<?xml version=""1.0"" encoding=""UTF-8""?>
<xmlns:vcn2=""http://www.oanon.com/ns/cmd/2010/01/oanon/""
xmlns:ikw=""http://www.oanon.com/ns/cmd/2010/05/oanon/"">
<contents>
  <operation>ikw:CancelJob</operation>
  <param_set servicetype=""ikw:print"">
    <vcn2:jobInfo jobID=""00000001"">
    <vcn2:cancelmode>ikw:normal</vcn2:cancelmode>
    <vcn2:cancelaction>ikw:NoCharge</vcn2:cancelaction> ←CHARGING STOP INSTRUCTION
    </vcn2:jobInfo>
  </param_set>
 </contents>
</cmd>
```

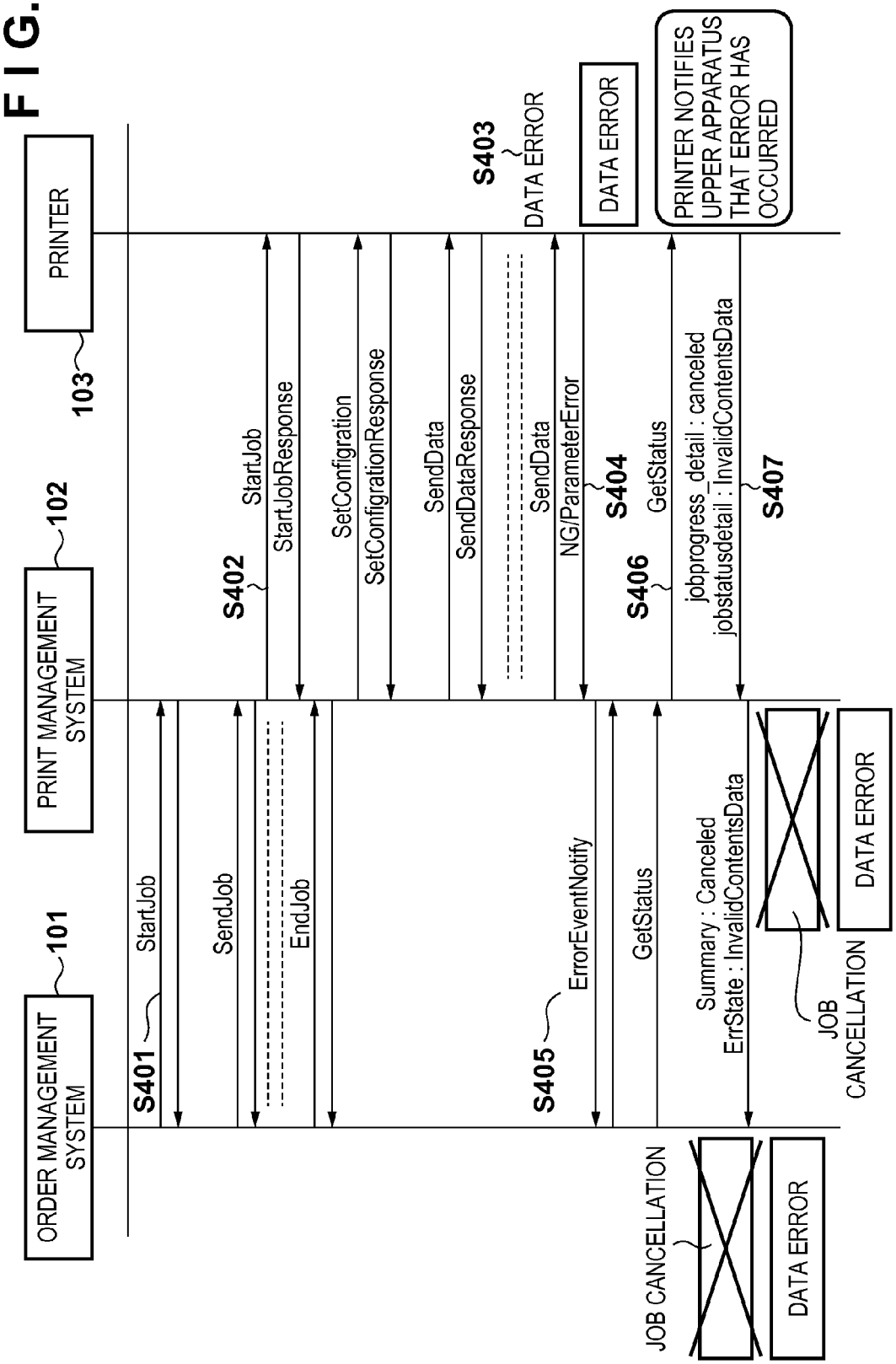

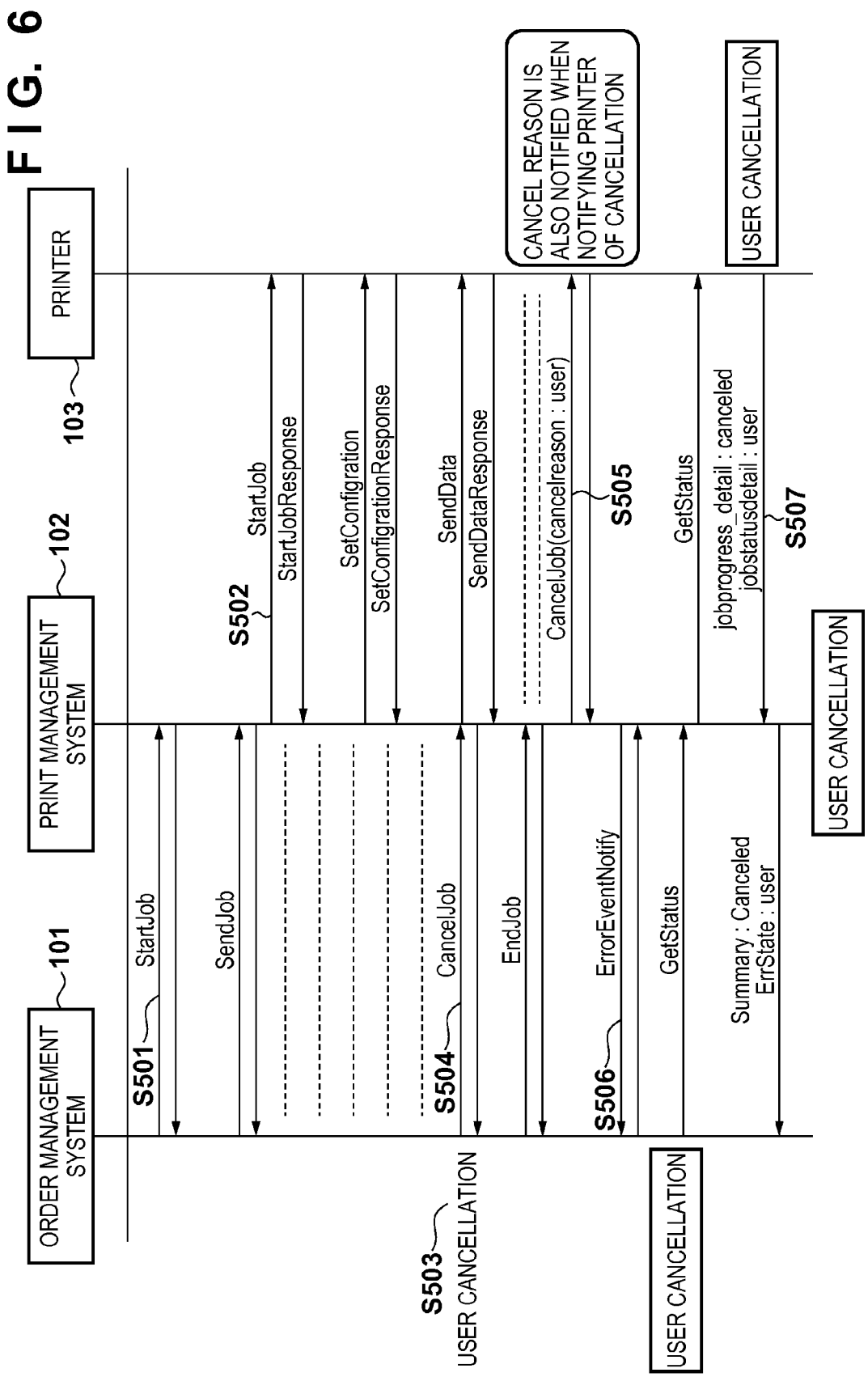

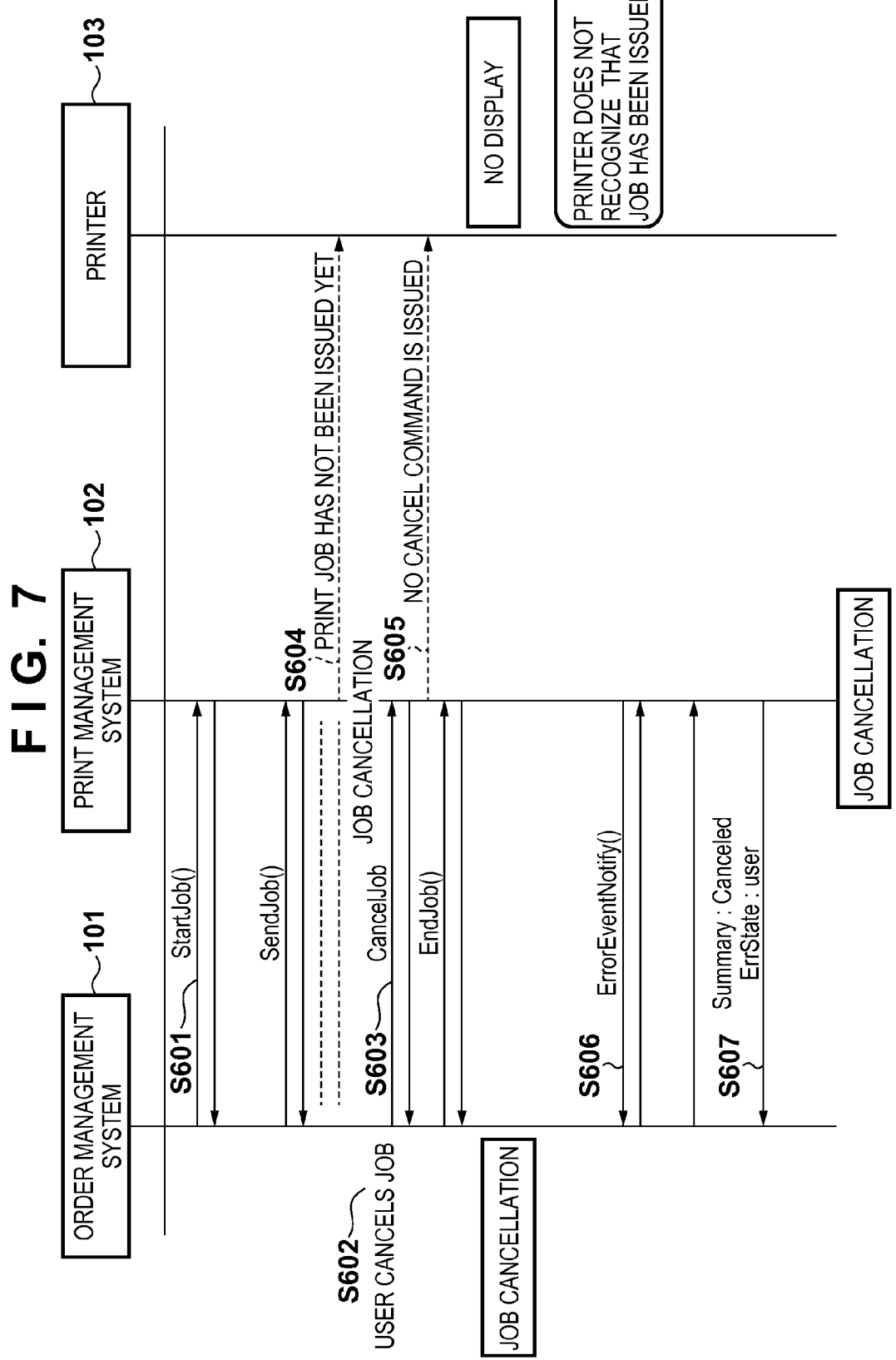

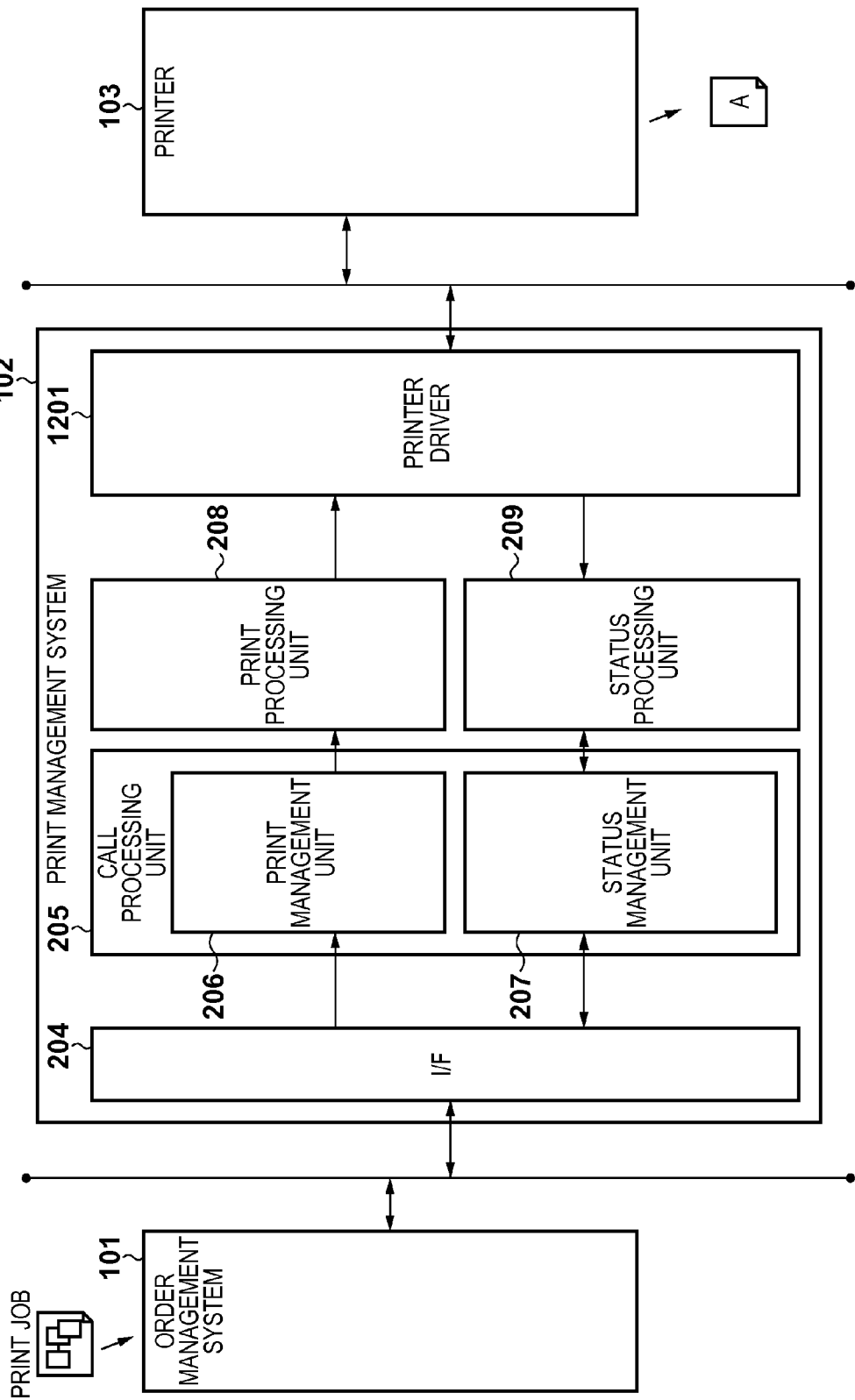

F I G. 16
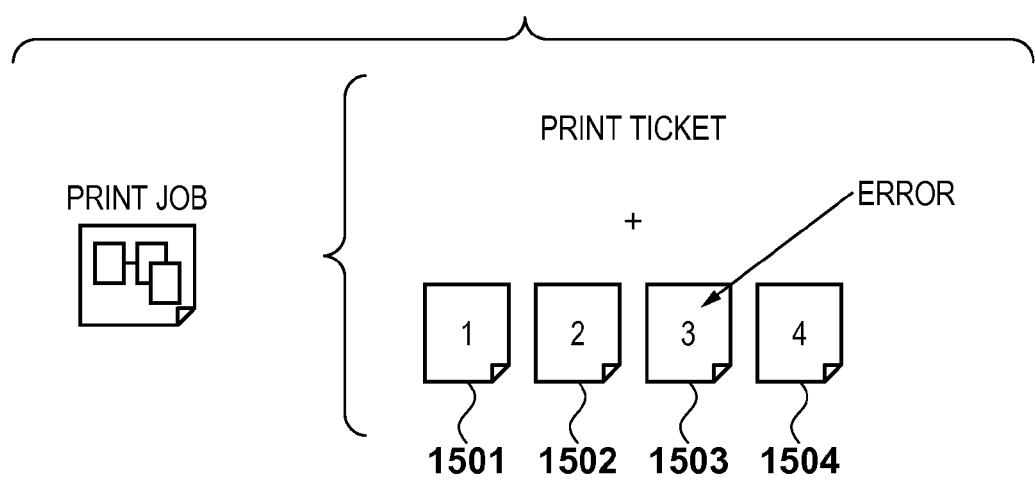

INFORMATION PROCESSING APPARATUS, CONTROL METHOD THEREOF, AND COMPUTER-READABLE MEDIUM

BACKGROUND OF THE INVENTION

1. Field of the Invention

The present invention relates to an information processing apparatus, control method thereof, and computer-readable medium and, more particularly, to control for sharing the status of a print job in a print system.

2. Description of the Related Art

A digital photo print system is formed from subsystems such as an order management system, print management system, and printer. The order management system receives an Internet order from the home PC (Personal Computer: to be referred to as a PC hereinafter) of an end user, or a print order in a DPE shop. The print order is transferred as a print job to each subsystem. The print management system converts the print job into a format processable by a predetermined printer. The converted print job is printed out by a dedicated printer installed in a place (laboratory) where printing is actually performed. In this system, the respective subsystems are often installed in places spaced apart from each other.

For example, when an error such as a paper jam occurs in a printer, a conventional print system reports the error to a host computer. There is a technique capable of correctly continuing printing after an error generation portion by reporting a print page on which the error has occurred, in addition to an error type such as a paper jam (see Japanese Patent Laid-Open No. 03-224778).

In the digital photo print system, when the order management system transfers a print job containing a job error, the subsequent print management system outputs an instruction to the printer to cancel the print job. In the conventional technique, the print management system notifies the order management system at an upper level that the error regarding the print job has occurred and the cause is a job error, or that the print job has been canceled. However, the printer at a lower level in print processing recognizes only that a cancel instruction to the print job has been issued.

Therefore, a display mismatch occurs between the subsystems. For example, the display unit of the print management system displays a job error, and that of the printer displays job cancellation. The printer cannot recognize the situation in which the cancel instruction has been issued. Also, even when the user cancels a print job issued from each upper subsystem, for example, the printer serving as a lower subsystem cannot recognize the situation in which the cancel instruction has been issued.

In other words, the reason of job cancellation cannot be shared between the devices. Particularly, the respective subsystems are often installed in places spaced apart from each other. It is very inconvenient for an end user, operator, or the like who actually operates each subsystem, that the reason of job cancellation cannot be shared.

SUMMARY OF THE INVENTION

The present invention has been made to solve the conventional problems, and can share the reason of job cancellation throughout upper to lower subsystems which form a print system.

According to one aspect of the present invention, there is provided an information processing apparatus which transfers a print job to a lower apparatus that is included in a print system and located at a lower level in print processing, comprising: a determination unit configured to determine whether to cancel the print job; and a cancel command issuing unit configured, when the determination unit determines to cancel processing for the print job, to issue, to the lower apparatus for the print job, a cancel command to which information about a cancel reason is added.

According to another aspect of the present invention, there is provided a method of controlling an information processing apparatus which transfers a print job to a lower apparatus that is included in a print system and located at a lower level in print processing, comprising the steps of: determining whether to cancel the print job; and issuing, when to cancel the print job is determined in the determining step, to the lower apparatus for the print job, a cancel command to which information about a cancel reason is added.

According to another aspect of the present invention, there is provided a non-transitory computer-readable medium storing a program for causing a computer to function as a determination unit configured to determine whether to cancel a print job transferred to a lower apparatus that is included in a print system and located at a lower level in print processing, and a cancel command issuing unit configured, when the determination unit determines to cancel the print job, to issue, to the lower apparatus for the print job, a cancel command to which information about a cancel reason is added.

The reason of cancellation of a print job can be shared throughout upper to lower subsystems which form a print system.

Further features of the present invention will become apparent from the following description of exemplary embodiments (with reference to the attached drawings).

BRIEF DESCRIPTION OF THE DRAWINGS

FIG. 1 is a view exemplifying a system arrangement according to an embodiment;

FIG. 2A is a block diagram exemplifying the arrangement of a print system according to the first embodiment;

FIG. 2B is a block diagram exemplifying the arrangement of an image processing unit according to the first embodiment;

FIG. 2C is a block diagram exemplifying the arrangement of an image processing unit according to the first embodiment;

FIG. 3 is a chart exemplifying a command sequence when a print management system detects a job error;

FIGS. 4A, 4B, and 4C are views exemplifying cancel commands;

FIG. 5 is a chart exemplifying a command sequence when the image processing unit detects a data error;

FIG. 6 is a chart exemplifying command sequence 1 when an order management system cancels a print job;

FIG. 7 is a chart exemplifying command sequence 2 when the order management system cancels a print job;

FIG. 13 is a block diagram exemplifying the arrangement of a print management system according to the second embodiment;

FIG. 16 is a view exemplifying a print job according to the third embodiment;

DESCRIPTION OF THE EMBODIMENTS

Figure 8:
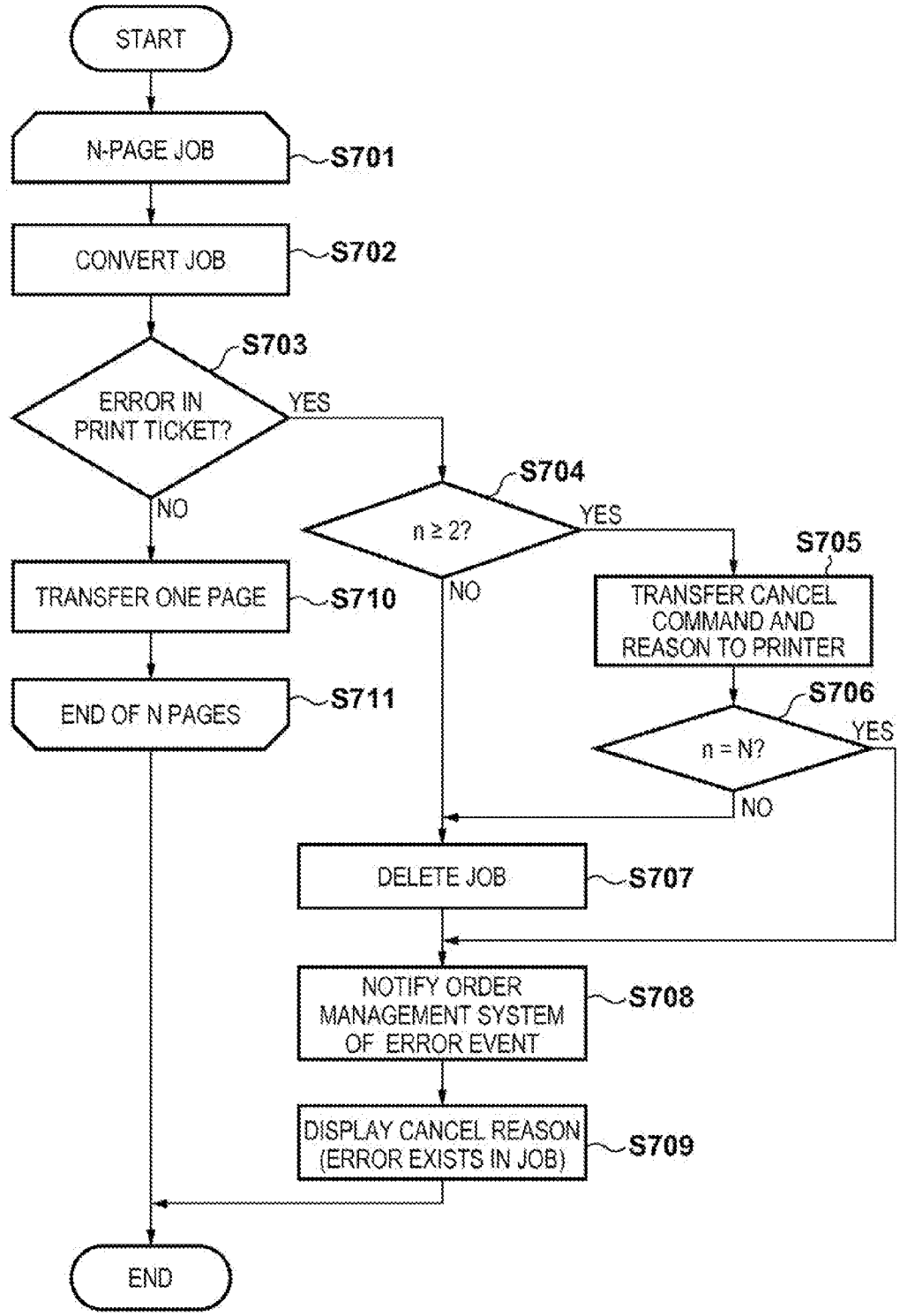
FIG. 8 is a flowchart showing the operation of the print management system when the print management system detects a job error according to the first embodiment.

Embodiments of the present invention will now be described in detail with reference to the accompanying drawings. It is to be understood that the following embodiments are not intended to limit inventions regarding the appended claims, and that not all combinations of features described in the embodiments are indispensable for the unit to solve the problems in the present invention.

First Embodiment

System Arrangement

The connection of a print system in the embodiment will be exemplified. The print system according to the embodiment includes an order management system 101, print management system 102, and printer 103, which are connected via a network 104, as shown in FIG. 1. Note that the number of systems of each type is one in FIG. 1, but is not limited to this. For example, a plurality of information processing apparatuses may implement processing of the order management system 101. Each system can be implemented by a general-purpose information processing apparatus such as a PC.

The order management system 101 receives a print order from the user, generates a print job containing print settings and image contents corresponding to the order, and issues it to the print management system 102. The print management system 102 analyzes and converts the generated print job, and issues it to the printer 103. Upon receiving the converted print job, the printer 103 prints in accordance with the print settings, and updates job status information managed in the printer 103.

The printer 103 periodically notifies the print management system 102 of the job status information. Note that the printer 103 may be, for example, an MFP (MultiFunction Peripheral) having the print function. Upon receiving a request from the order management system 101, the print management system 102 notifies the order management system 101 of the job status information.

In this specification, an apparatus at a level where it executes processing earlier in a processing sequence, for example, receives data first, will be described as an apparatus at an upper level, compared to another apparatus. In contrast, an apparatus which performs processing later will be described as an apparatus at a lower level.

(Print System)

The arrangement of the print system according to the embodiment will be described with reference to the block diagram of FIG. 2A. The print system according to the embodiment includes the order management system 101, print management system 102, and printer 103. The print management system 102 includes an I/F 204 between the order management system 101 and the print management system 102, a call processing unit 205, a print management unit 206, a status management unit 207, a print processing unit 208, a status processing unit 209, and a protocol processing unit 210.

The I/F 204 is an I/F at a boundary where a request from the order management system 101 is transferred to the print management system 102. The I/F 204 also includes an event notification I/F from the print management system 102 to the order management system 101. The call processing unit 205 accepts a request from the order management system 101 as an instance. The call processing unit 205 returns a processing result to the accepted request. More specifically, the call processing unit 205 performs processing request acceptance/result return for initialization, setting change, end, error notification, and the like. The print management unit 206 performs request acceptance/result return for a print job and other jobs. The status management unit 207 performs request acceptance/result return for status acquisition and listener registration. The status management unit 207 also notifies a difference event and tracking job event by a registered listener.

The print processing unit 208 queues print jobs accepted by the print management unit 206, and sequentially transfers them to the printer 103. In the embodiment, the print processing unit 208 has an internal arrangement as shown in FIG. 2B. A job management unit 212 holds job data accepted from the print management unit 206, and converted job data. A job conversion unit 213 analyzes and converts job data. The job conversion unit 213 in the print processing unit 208 detects a job error in a print job. A job transfer unit 214 inputs the converted job data to the protocol processing unit 210, and acquires a response to it.

The status processing unit 209 queues a status acquisition request accepted by the status management unit 207, and transfers it to the printer 103. The status processing unit 209 holds, as a status cache, a status which has been acquired from the printer 103 as a response to the status acquisition request. Further, the status processing unit 209 detects a state transition, and inputs it to an event notification unit (not shown). The protocol processing unit 210 performs queuing control of requests from the respective processing units, port allocating, and transfer/reception control to/from the printer 103.

In the embodiment, an image processing unit 211 in the printer 103 has an arrangement as shown in FIG. 2C. Upon receiving a print job from the print management system 102, an image conversion unit 215 analyzes the print settings and content data of a print ticket. The image conversion unit 215 rasterizes the content data according to the analyzed print settings. A color conversion unit 216 converts the rasterized content data from RGB into CMYK. A print command generation unit 217 generates a print command in the CMYK format using the converted content data, and transfers it to a printer engine 218. The printer engine 218 outputs an image in accordance with the generated print command.

In the embodiment, a print job which is generated by the order management system 101 and transferred to the print management system 102 includes contents and a print ticket formed from information such as print settings and copy count setting. The contents comply with, for example, JPEG (Joint Photographic Experts Group), BMP (Bit MaP), or PDF (Portable Document Format). The print management unit 206 in the call processing unit 205 accepts, via the I/F 204, a request which is a print job input from the order management system 101 to the print management system 102. The print management unit 206 generates a provisional status called a pseudo job status.

The pseudo job status will be explained. In general, there is a time lag until the printer 103 sends back an actual print job status after a print job is issued to the printer 103. The pseudo job status is therefore used as a provisional status until job status information is received from the printer 103. A print job which has been accepted by the print management system 102 and is queued has not been issued yet to the printer 103, and cannot be acquired as job status information of the printer 103. However, the print job itself has already been issued from the order management system 101 to the print management system 102, so the print management system 102 performs the state management.

Status items to be managed as a pseudo job status will be exemplified below:
job name designated by the order management side
user name designated by the order management side
job type
acceptance number (order ID)
job priority
summary information of the job status
detailed information of the job status
job error information Further, the print job is transferred from the print management unit 206 to the print processing unit 208. The print processing unit 208 analyzes the print job, and converts it into a command optimized for the printer 103. At this time, the print ticket which forms the print job is analyzed and converted into a command, but no content is converted. The protocol processing unit 210 transfers the converted print job to the printer 103. The image processing unit 211 in the printer 103 renders the content and prints it out in accordance with the print ticket information, that is, print settings which form the print job.

Upon receiving the print job, the printer 103 generates job status information. The printer 103 notifies the print management system 102 of the updated job status information at a periodical timing.

The updated job status information is transferred to the status processing unit 209 via the protocol processing unit 210. The status processing unit 209 holds the accepted job status information as a status cache. Upon receiving a status acquisition request from the status management unit 207, the status processing unit 209 transfers the updated job status information to the status management unit 207, and the status management unit 207 updates the managed job status information. The order management system 101 is notified via the I/F 204 of the newly updated job status information. By using the notified job status information, the order management system 101 updates job status information managed by it.

[Generated Error]

A lower subsystem sometimes determines that a print job created as a result of a print instruction by an end user in the order management system 101 is an error job arising from data impropriety. This occurs in roughly two cases. In one case, for example, a print instruction designates double-sided print though double-sided print is impossible for a selected paper medium, or there is no content to be printed. These errors arise from impropriety of a print ticket which describes print settings. A print job error arising from impropriety of a print ticket will be called a "job error".

In the other case, a print-designated content in the order management system 101 has a file format which is not a print target of the printer 103, or a file itself is corrupted. In this case, an error arises from impropriety in the target content of a print job, and this error will be called a "data error". In the embodiment, errors arising from two types of data impropriety exist.

In the embodiment, the print processing unit 208 in the print management system 102 detects a job error regarding print ticket information which forms a print job. The image processing unit 211 in the printer 103 detects a data error regarding an image content.

[Command Sequence Upon Job Error]

An example of a command sequence when the print management system 102 detects a job error regarding a print ticket will be explained with reference to FIG. 3.

First, an example of a command sequence when the print processing unit 208 of the print management system 102 detects a job error in print ticket information that forms the print job during issuing of a print job to the printer 103 will be explained.

The order management system 101 issues a print job to the print management system 102 according to a predetermined sequence (step S301).

Upon receiving the print job, the print management system 102 issues the print job when it can start issuing the print job to the printer 103 (step S302). That is, the print management system 102 can start issuing the print job to the printer 103 before the end of receiving all data of the print job from the order management system 101. Assume that the print processing unit 208 in the print management system 102 detects a job error in the print job while issuing the print job to the printer 103 (step S303). In this case, the print management system 102 cancels the issuing of the print job to the printer 103 (step S304).

For example, assume that the print job is formed from three contents, and the print management system 102 detects a job error during processing of the third content and the print ticket. In this case, the print management system 102 issues a cancel command to cancel the print job issued to the printer 103.

More specifically, the user issues a print instruction with the following settings in the order management system 101:
The XML description of a print ticket is incorrect.
A print setting parameter is improper (for example, the double-sided print setting is designated for single-sided print paper or a nonexistent parameter is set).
A file name described in a print ticket does not match the file name of a content.

In this case, the print management system 102 detects that a job error has occurred. In step S304, reason information about cancellation (to be referred to as a cancel reason hereinafter) is added to the cancel command issued by the print management system 102. From this information, the printer 103 can recognize that the print job is canceled not by merely "job cancellation" but by cancellation owing to a "job error".

If no cancel reason is added to the cancel command, the printer 103 recognizes that the print job is canceled by merely "job cancellation", and displays "job cancellation" on the UI (User Interface) of the printer 103. As error details are differentiated finely, an error detail recognition error may occur between upper and lower apparatuses though this depends on the error management implementation of the system in practice.

FIG. 4A exemplifies a cancel command. This cancel command is a cancel command to which a cancel reason described in the xml format is added. In FIG. 4A, the following description represents error details corresponding to "job cancellation":

<operation>ikw:CancelJob</operation>
<vcn2:cancelreason>ikw:InvalidJobStruct</vcn2:can celreason>

The print management system 102 notifies the order management system 101 at an upper level that the job error has occurred (step S305).

Upon receiving the notification ErrorEventNotify from the print management system 102, the order management system 101 issues a status acquisition command GetStatus to a lower system. The issued status acquisition command reaches the printer 103 via the print management system 102. The printer 103 sends back job status information to the print management system 102 (step S306).

The print management system 102 reflects, in data held by it, the job status information acquired from the printer 103, and sends back the status information to the upper order management system 101. At this time, the print management system 102 displays the "job error" information on the UI, as needed. The order management system 101 also reflects the received job status information in data held by it, and displays the "job error" information on the UI, as needed.

FIG. 4B exemplifies the cancel reason of the cancel command and job status error information. Information <cancelreason> serving as the cancel reason added to the cancel command is managed as job status error information <jobstatusdetail> in the printer 103. The printer 103 sets the job status error information <jobstatusdetail> in the status upon status acquisition, and sends it back to a system at an upper level. As a result, the error information can be unified throughout upper to lower systems.

[Command Sequence Upon Data Error]

A case in which a data error occurs in content data will be described. Examples in which a data error occurs in content data are as follows.

The file format of a content does not match a file format declared in a print ticket.
The file format of a content is not supported.
A content is improper (for example, a content file is corrupted).

In this case, the printer 103 detects that a data error has occurred. An example of a command sequence when the image processing unit 211 in the printer 103 detects a data error regarding a content will be explained with reference to FIG. 5.

The order management system 101 issues a print job to the print management system 102 according to a predetermined sequence (step S401). Upon receiving the print job, the print management system 102 issues the print job when it can start issuing the print job to the printer 103 (step S402). Assume that the printer 103 detects a data error in the received job during reception of the print job (step S403). In this case, the printer 103 sends back a response "NG" to the print management system 102 (step S404).

Upon receiving the response "NG", the print management system 102 notifies the upper order management system 101 of the error (step S405). Upon receiving the notification ErrorEventNotify, the order management system 101 issues a command GetStatus to acquire job status information. The print management system 102 issues a command to the printer 103 to acquire job status information of the printer 103 (step S406).

The printer 103 notifies the upper system of the job status information. At this time, the job status information contains error detail information of a cancel job (step S407). The error information can therefore be shared throughout the upper to lower systems. If there is no error detail information of the cancel job, the print management system 102 and order management system 101 can only determine that the printer 103 has canceled the job at the upper levels. In this case, the print management system 102 and order management system 101 recognize that the printer 103 has performed merely "job cancellation", and display "job cancellation" on UIs corresponding to the printer 103.

(Processing in Print Management System)

The operation of the print management system 102 in the embodiment will be explained with reference to the flowchart of FIG. 8. Note that this processing is implemented by reading out a program held in a storage unit (not shown) and executing it by the CPU (not shown) of the print management system 102.

The print management system 102 starts the processing upon receiving a print job of N pages from the order management system 101. Of the N pages contained in the print job, the page of interest is described as the nth page. The print management system 102 repeats the following processes for N pages contained in the received print job (steps S701 to S711). The print management system 102 analyzes and converts the page of interest in the print job (step S702).

The print management system 102 determines whether an error exists in the print ticket in print ticket analysis of the print job (step S703). If no error exists in the print ticket (NO in step S703), the print management system 102 transfers the page of interest to the printer 103 when it can transfer the page of interest (step S710). Unless an error occurs, the print management system 102 repeats job conversion/transfer processing till the completion of transferring N pages. Upon completion of normally transferring all pages, the print management system 102 displays a message to this effect on the UI.

If an error has been detected in the print ticket (YES in step S703), the print management system 102 determines whether the page of interest is the second or subsequent page (step S704). If the page of interest is the first page (NO in step S704) the print management system 102 deletes the print job from the queue (step S707). The process then advances to step S708.

If the page of interest is the second or subsequent page (YES in step S704), the print job has already been issued to the printer 103. Thus, the print management system 102 issues a job cancel command to the printer 103 for the print job. At this time, the print management system 102 adds the cancel reason to the job cancel command, and transfers the job cancel command (step S705). The print management system 102 determines whether the page of interest is the Nth page (step S706).

If the page of interest is not the Nth page (NO in step S706), the print management system 102 deletes the print job from the queue (step S707). Accordingly, no subsequent print job is issued even during processing of the print job. If the page of interest is the Nth page (YES in step S706), the process advances to step S708.

The print management system 102 notifies the order management system 101 at an upper level of the error event (step S708). The print management system 102 displays the cancel reason ("job error" in this case) on the UI, and ends the processing sequence (step S709).

(Processing in Order Management System)

Figure 10:
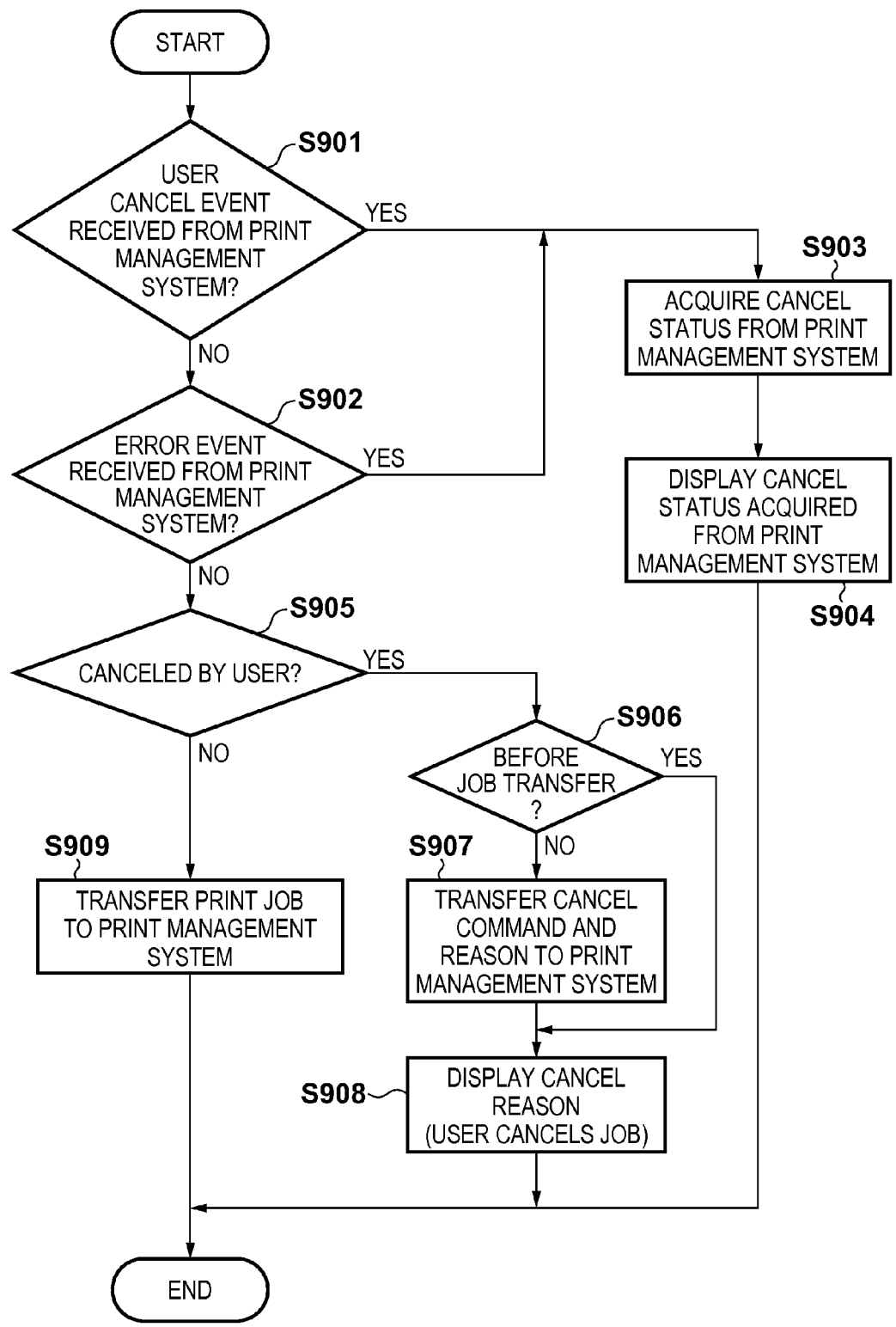
FIG. 10 is a flowchart showing the operation of the order management system according to the first embodiment.

The operation of the order management system 101 will be explained with reference to the flowchart of FIG. 10. Note that this processing is implemented by reading out a program held in a storage unit (not shown) and executing it by the CPU (not shown) of the order management system 101.

The order management system 101 determines whether the print management system 102 has instructed the order management system 101 to cancel a print job until the order management system 101 issues a print job and transfers it to the print management system 102 (step S901). If the order management system 101 has not received a cancel instruction (NO in step S901), it determines whether the order management system 101 has received a notification that an error has been detected in a system at a lower level, including the print management system 102, until the order management system 101 transfers the print job (step S902).

If the order management system 101 has not received an error notification from the print management system 102 (NO in step S902) it determines whether the user has canceled the print job (step S905). If the user has not canceled the print job (NO in step S905), the order management system 101 transfers the print job to the print management system 102 (step S909). After that, the processing sequence ends.

If the user has canceled the print job (YES in step S905), the order management system 101 confirms whether the print job has not been transferred yet to the print management system 102 (step S906). If the print job has not been transferred yet (YES in step S906), the order management system 101 advances to step S908. If transfer of the print job has started (NO in step S906), the order management system 101 transfers a cancel reason to the print management system 102 together with a cancel command (step S907). The order management system 101 displays the cancel reason on the UI, and ends the processing. As the cancel reason displayed here, a message that the user has canceled the print job is displayed.

If the order management system 101 receives a cancel instruction or error notification from the print management system 102 (YES in step S901 or S902), the process advances to step S903. The order management system 101 acquires the cancel reason (one of "job error", "data error", and "user cancellation" in this case) from the print management system 102 (step S903). The order management system 101 displays the acquired cancel reason on the UI (step S904). The processing sequence then ends.

(Processing in Printer)

The operation of the printer 103 will be explained with reference to the flowchart of FIG. 11. Note that this processing is implemented by reading out a program held in a storage unit (not shown) and executing it by the CPU (not shown) of the printer 103.

Figure 11:
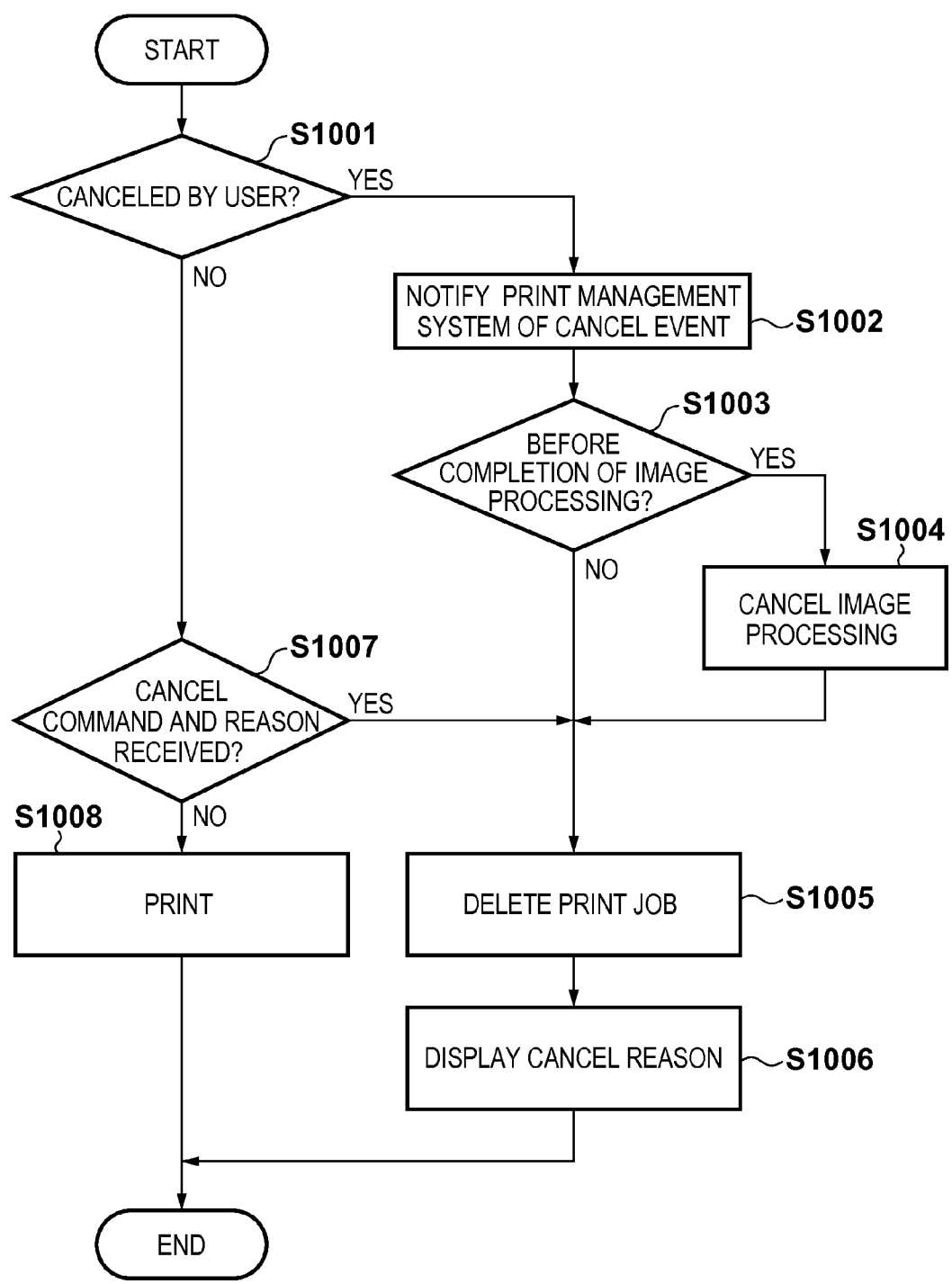
FIG. 11 is a flowchart showing the operation of a printer according to the first embodiment.

After the start of processing in FIG. 11, the printer 103 determines whether the user has canceled a print job (step S1001). If the user has not canceled the print job (NO in step S1001), the printer 103 determines whether it has received a job cancel command and cancel reason from the print management system 102 (step S1007). If the printer 103 has not received a cancel command (NO in step S1007), it executes print processing for the print job (step S1008). Upon completion of printing the print job, the printer 103 displays a message to this effect on the UI, and ends the processing sequence.

If the printer 103 has received a job cancel command and a cancel reason added to it from the print management system 102 at an upper level (YES in step S1007), it deletes and cancels the print job (step S1005). The printer 103 displays the cancel reason ("job error" in this case) on the UI, and ends the processing sequence (step S1006).

If the user has canceled the print job (YES in step S1001), the printer 103 notifies the print management system 102 that the print job has been canceled (step S1002). The printer 103 confirms whether image processing for the print job has not been completed yet (step S1003). If image processing has not been completed yet (YES in step S1003), the printer 103 cancels image processing for the print job (step S1004). Thereafter, the process advances to step S1005. If image processing has been completed (NO in step S1003), the process advances to step S1005.

The printer 103 deletes the print job (step S1005), and displays the cancel reason ("user cancellation" in this case) on the UI (step S1006).

[Data Error Detection Processing]

Figure 12A:
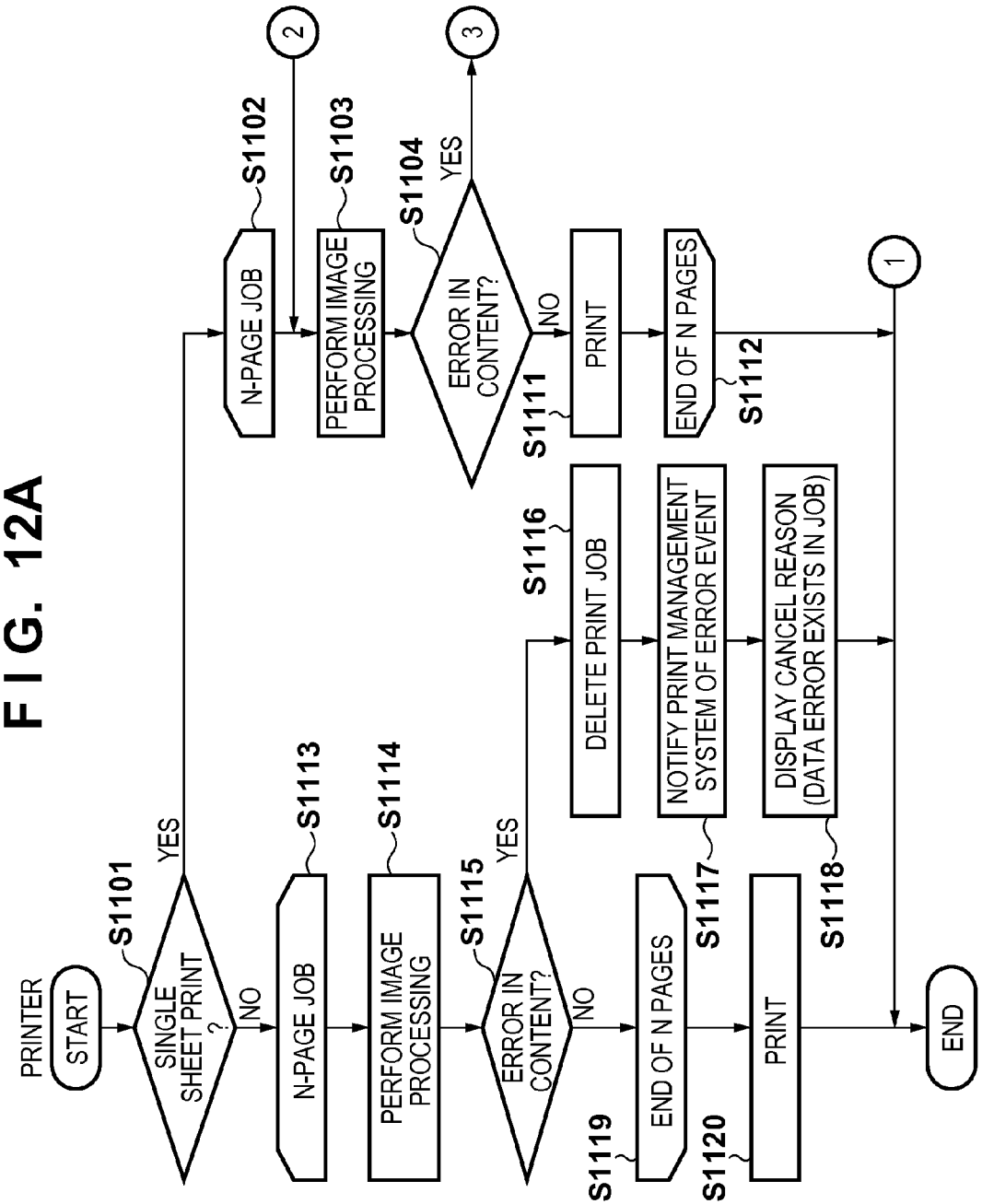
FIGS. 12A and 12B are flowcharts showing the operation of the printer which changes processing depending on the form of a printed product when a data error occurs in a print job according to the first embodiment.
Figure 12B:
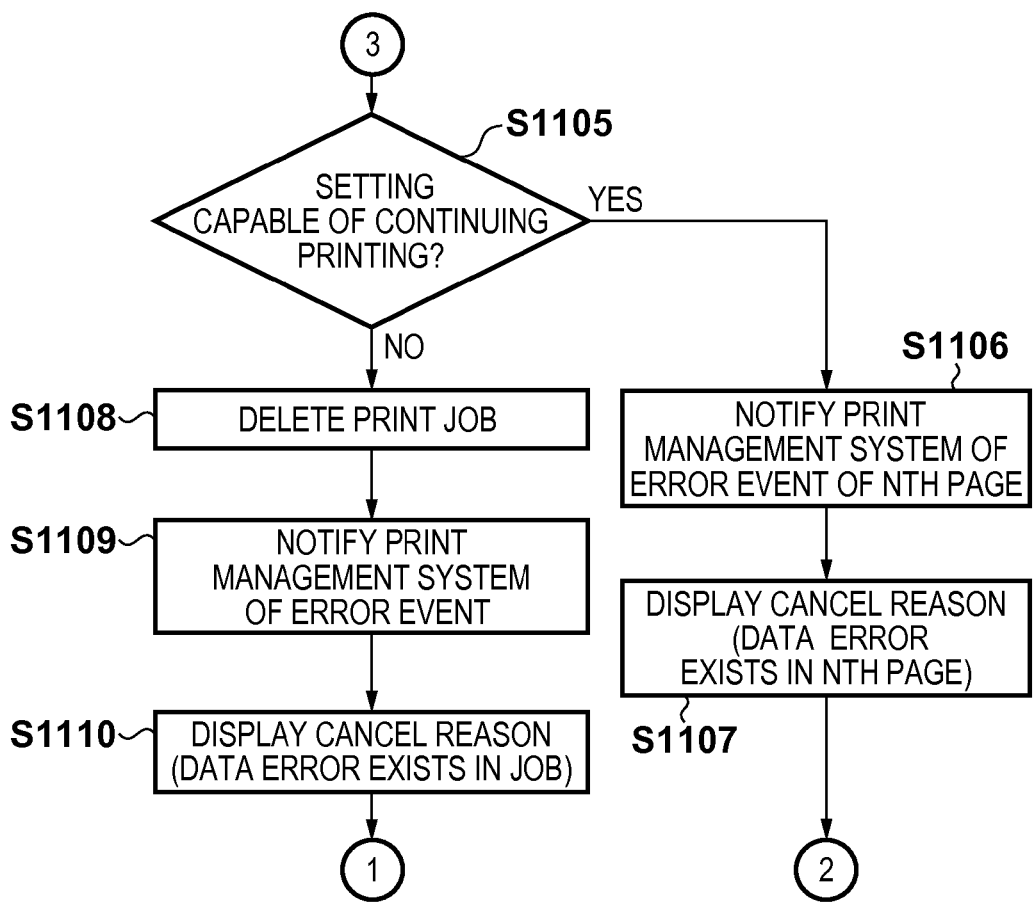

The operation of the printer 103 when a data error is detected in a print job will be described with reference to FIGS. 12A and 12B. Note that this processing is implemented by reading out a program held in the storage unit (not shown) and executing it by the CPU (not shown) of the printer 103.

When a data error occurs, the printer 103 changes processing depending on the form setting of a printed product. Assume that the form setting is described in the print ticket. After the start of processing, the printer 103 determines whether a print job designates single sheet print (step S1101). "Single sheet print" is print processing of outputting a printed material formed from one sheet. In contrast to "single sheet print", print processing of outputting a book-like printed material formed from a plurality of pages will be described as "book print". If the print job designates single sheet print (YES in step S1101), the printer 103 performs processes in steps S1102 to S1112. If the print job does not designate single sheet print (NO in step S1101), the printer 103 performs processes in steps S1113 to S1120.

The printer 103 sequentially processes, as the page of interest, N pages which form the print job (step S1102). First, the printer 103 starts image processing for the first page as the page of interest (step S1103). The printer 103 determines whether an error exists in the content of the page of interest (step S1104). If the printer 103 detects that an error exists in the content data (YES in step S1104), the printer 103 determines whether the setting can continue printing (step S1105). As the setting capable of continuing printing, for example, if there is a single-sheet single-sided print setting, it can be determined that printing can continue for pages other than a page on which an error has occurred, so processing can continue.

If the setting can continue print processing (YES in step S1105), the printer 103 notifies the upper print management system 102 that an error has occurred in the page of interest (step S1106). The printer 103 displays the cancel reason ("data error" in this case) on the UI of the printer 103 (step S1107). The process returns to step S1103, and the printer 103 continues image processing for subsequent pages.

If the printer 103 determines in step S1105 that printing cannot continue (NO in step S1105), it deletes the received print job (step S1108). As a case in which printing cannot continue, for example, if image data on the obverse surface is improper in single-sheet double-sided print, printing on the reverse surface should not continue. The printer 103 issues, to the upper print management system 102, an error event notification that a data error has occurred (step S1109). The printer 103 displays the cancel reason ("data error" in this case) on the UI of the printer 103 (step S1110). Thereafter, the processing sequence ends.

If no error exists in the content of the page of interest (NO in step S1104), the printer 103 executes printing of the page of interest (step S1111). The printer 103 performs print processing for all pages unless an error occurs. The printer 103 displays the completion of printing on the UI of the printer 103, and ends the processing sequence.

If the print job designates not single sheet print but book print (NO in step S1101), the printer 103 sequentially processes, as the page of interest, N pages which form the print job (step S1113). First, the printer 103 starts image processing for the first page (step S1114). The printer 103 determines whether an error exists in the content of the page of interest (step S1115). If the printer 103 detects that an error exists in the content data (YES in step S1115), it deletes the received print job (step S1116). The printer 103 notifies the upper print management system 102 of an error event representing that a data error has occurred (step S1117). The printer 103 displays the cancel reason ("data error" in this case) on the UI of the printer 103 (step S1118). Then, the processing sequence ends.

If no error exists in the content (NO in step S1115), the printer 103 performs image processing for all pages which form the print job, unless an error occurs (step S1119). The printer 103 prints the print job having undergone image processing (step S1120). The printer 103 displays the completion of printing on the UI of the printer 103, and ends the processing sequence.

Note that the embodiment of the printer which switches processing depending on the form of a printed product has been explained with reference to FIGS. 12A and 12B (step S1101). However, the printer may not switch processing. In this case, only the processes in steps S1113 to S1120 are executed to delete a print job if an error exists in the content regardless of the form of a printed product. In other words, there is no single sheet print processing.

[Command Sequence 1 Upon User Cancellation]

A case in which the print management system detects an error has been described as a case in which the print management system 102 issues a cancel command. Another case in which the user cancels a print job in the order management system 101 after the order management system 101 issues the print job will be explained with reference to FIG. 6.

First, the order management system 101 issues a print job to the print management system 102 according to a predetermined sequence (step S501). Upon receiving the print job, the print management system 102 issues the job when it can start issuing the print job to the printer 103 (step S502). That is, the print management system 102 can start issuing the job to the printer 103 before the end of receiving all the print jobs from the order management system 101.

Assume that the print job is canceled in the order management system 101 while the print management system 102 issues the print job to the printer 103 (step S503). In response to this, the order management system 101 issues a cancel command to the print management system 102 (step S504). Upon receiving the cancel command from the order management system 101, the print management system 102 cancels the issuing of the print job to the printer 103 (step S505). A cancel reason to be added to the cancel command issued by the print management system 102 in step S504 is as follows:

<operation>ikw:CancelJob</operation>
<vcn2:cancelreason>ikw:user</vcn2:cancelreason>

This represents that the user has canceled transfer of the print job.

[Command Sequence 2 Upon User Cancellation]

Upon receiving a print job from the order management system 101, the print management system 102 issues the job when it can start issuing the print job to the printer 103. However, assume that the order management system 101 cancels the print job and the cancel command reaches the print management system 102 before the print management system 102 issues the print job. In this case, the print management system 102 does not issue the cancel command to the printer 103. FIG. 7 shows a command sequence in this case.

In FIG. 7, the order management system 101 issues a print job to the print management system 102 according to a predetermined sequence (step S601). Upon receiving the print job from the order management system 101, the print management system 102 issues the job when it can start issuing the print job to the printer 103. Assume that the print job is canceled in the order management system 101 before the print management system 102 issues the job (step S602). In this case, the order management system 101 notifies the print management system 102 of the cancel command (step S603). At this time, the print management system 102 has not issued the print job to the printer 103 yet (step S604), and determines that no cancel command need be issued. Hence, the print management system 102 does not issue a cancel command to the printer 103 (step S605).

Since the target print job has been canceled, the print management system 102 notifies the upper order management system 101 of an error event (step S606). In response to the notification ErrorEventNotify from the print management system 102, the order management system 101 issues a job status acquisition command. Upon receiving the job status acquisition command, the print management system 102 issues the job status acquisition command to the printer 103. In this case, the printer 103 has not recognized the presence of the target print job, and sends back job status information together with a cancel reason using a pseudo job status managed in the print management system 102 (step S607).

(Processing in Print Management System)

Figure 9:
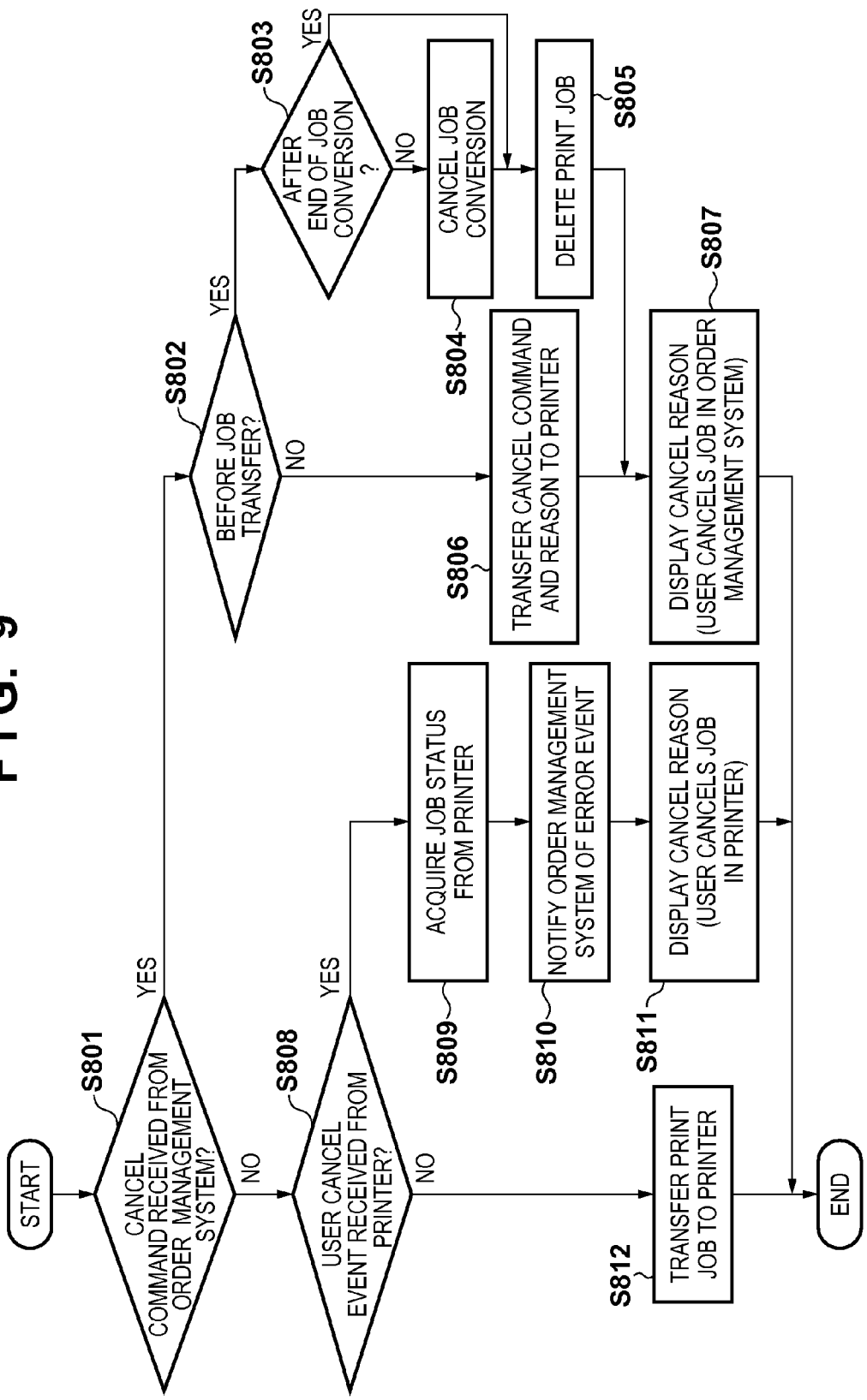
FIG. 9 is a flowchart showing the operation of the print management system when the user cancels a print job in the order management system according to the first embodiment.

The operation of the print management system 102 when the user cancels a print job in the order management system 101 will be explained with reference to the flowchart of FIG. 9. Note that this processing is implemented by reading out a program held in the storage unit (not shown) and executing it by the CPU (not shown) of the print management system 102.

The print management system 102 determines whether upon receiving a print job from the order management system 101 at an upper level, it has received a cancel command from the order management system 101 to cancel the print job (step S801). If the print management system 102 has received the cancel command from the order management system 101 (YES in step S801), it determines whether the print management system 102 has already transferred the print job to the printer 103 (step S802).

If the print management system 102 has not transferred the print job to the printer 103 yet (YES in step S802), it determines whether job conversion processing for issuing the print job to the printer 103 has already ended (step S803). If the print job is being converted (NO in step S803), the print management system 102 cancels the job conversion (step S804). The print management system 102 deletes the print job from the queue of the print management system 102, and cancels transfer of the print job (step S805). The process then advances to step S807. If conversion of the print job has ended (YES in step S803), the process directly advances to step S805.

If the print management system 102 has already issued the print job to the printer 103 (NO in step S802), it adds the cancel reason to a cancel command for canceling printing of the target print job, and issues the cancel command. The print management system 102 transfers the issued cancel command to the printer 103 (step S806).

The print management system 102 displays the cancel reason ("user cancellation" in this case) on the UI of the print management system 102, and ends the processing sequence (step S807).

If the print management system 102 has not received the cancel command from the order management system 101 (NO in step S801), it confirms whether it has received a print job cancel event notification from the printer 103. This notification is issued when, for example, the user cancels reception of a print job by operating the panel of the printer 103 while the printer 103 receives the print job. If the print management system 102 has received the cancel event notification (YES in step S808), it acquires job status information from the printer 103 (step S809). The print management system 102 notifies the order management system 101 at an upper level of an error event (step S810). After that, the print management system 102 displays, on the UI of the print management system 102, the cancel reason ("user cancellation" in this case) based on the cancel status acquired from the printer 103, and ends the processing sequence (step S811).

If the print management system 102 has not received the cancel event notification from the printer 103 (NO in step S808), it transfers the print job to the printer 103 (step S812). If no error occurs in the print job, all the print job has been transferred to the printer 103, and printing is completed, the print management system 102 displays the completion of transfer on the UI of the print management system 102, and ends the processing sequence.

Note that the operation of the order management system 101 complies with the sequence described with reference to the flowchart of FIG. 10. In this case, in step S903, the cancel reason acquired from the print management system 102 is "user cancellation". In step S904, the order management system 101 displays a message to this effect on the UI of the order management system 101.

The operation of the printer 103 complies with the sequence described with reference to the flowchart of FIG. 11. In this case, in step S1006, the cancel reason displayed on the UI of the printer 103 is "user cancellation".

When the cancel reason is "user cancellation", information representing a subsystem which has accepted the cancel instruction from the user may be further contained.

As described above, in the first embodiment, information about the reason why a print job has been canceled can be shared between the subsystems. Further, displays in the respective subsystems can be made to match each other.

Second Embodiment

The arrangement of a print system according to the second embodiment will be described with reference to the block diagram of FIG. 13. The same reference numerals as those in the first embodiment denote the same parts. In FIG. 2A of the first embodiment, the printer 103 includes the image processing unit 211 which renders an image content. In the second embodiment, a printer driver 1201 exists in a print management system 102. In the second embodiment, the printer driver 1201 in the print management system 102 renders an image content.

In the second embodiment, the print management system 102 detects both a job error regarding job ticket information which forms a print job, and a job error regarding an image content.

A print job which is generated by an order management system 101 and transferred to the print management system 102 includes a job ticket formed from information such as print settings and copy count setting, and image contents of JPG, BMP, PDF, or the like.

A print management unit 206 in a call processing unit 205 accepts, via an I/F 204, a request which is a print job input from the order management system 101 to the print management system 102. The print management system 102 generates a pseudo job status. A print processing unit 208 receives and analyzes the print job, and convers a job ticket, which forms the print job, into a command optimized for a printer 103.

The printer driver 1201 renders the content. The printer driver 1201 also functions as the protocol processing unit 210 in FIG. 2A according to the first embodiment. The converted print job is transferred to the printer 103 and printed out.

Upon receiving the print job, the printer 103 generates job status information. The printer 103 notifies the print management system 102 of the updated job status information at a periodical timing.

The updated job status information is transferred to a status processing unit 209 via the printer driver 1201, and held as a status cache. Upon receiving a request from a status management unit 207, the status processing unit 209 transfers the updated job status information to the status management unit 207. The status management unit 207 updates job status information managed by it. The order management system 101 is notified via the I/F 204 of the updated job status information. By using the received job status information, the order management system 101 updates the managed job status information.

In the arrangement shown in FIG. 13 according to the second embodiment, the print management system 102 detects both a job error regarding job ticket information which forms a print job, and a data error regarding a content. A command sequence in this case is the same as that shown in FIG. 3 according to the first embodiment. The command sequence upon a data error shown in FIG. 5 according to the first embodiment is not executed in the second embodiment. Also, command sequences when the order management system 101 cancels a print job are the same as those shown in FIGS. 6 and 7 according to the first embodiment.

[Operation of Print Management System]

Figure 14:
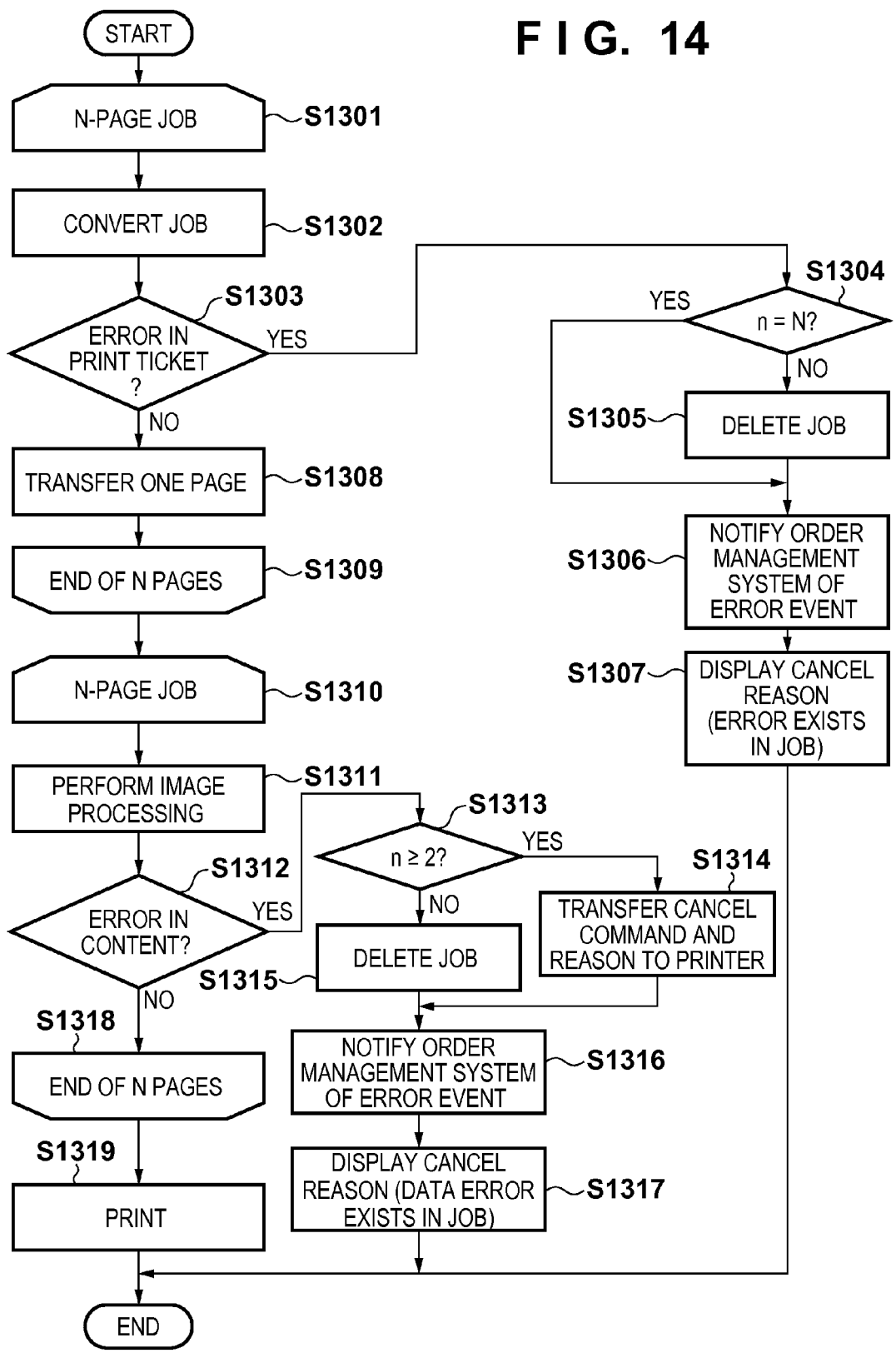
FIG. 14 is a flowchart showing the operation of the print management system when a printer driver exists in the print management system according to the second embodiment.

The operation of the print management system 102 when the print management system 102 detects a job error will be described with reference to the flowchart of FIG. 14. Note that this processing is implemented by reading out a program held in a storage unit (not shown) and executing it by the CPU (not shown) of the print management system 102. In this case, a print job is formed from N pages, and the page of interest is described as the nth page.

The print management system 102 starts the processing upon receiving a print job of N pages from the order management system 101, and executes the following processes for the respective pages which form the print job (steps S1301 to S1309). The print management system 102 analyzes and converts the page of interest in the print job (step S1302).

The print management system 102 determines whether an error exists in the print ticket in print ticket analysis of the print job (step S1303). This error determination corresponds to determination of whether a job error exists. If no error exists (NO in step S1303), the print management system 102 transfers the page of interest to the print processing unit 208 in the print management system 102 (step S1308). The print management system 102 transfers, to the print processing unit 208, all pages which form the print job unless an error occurs in the page of interest. The process then advances to step S1310.

If an error exists in the print ticket (YES in step S1303), the print management system 102 determines whether the page of interest having the error is the final page (step S1304). If the page of interest is the final page (YES in step S1304), the process directly advances to step S1306. If the page of interest is not the final page (NO in step S1304), the print management system 102 deletes the print job from the queue (step S1305). The print management system 102 notifies the order management system 101 at an upper level of the error event (step S1306). The print management system 102 displays the cancel reason ("job error" in this case) on the UI of the print management system 102, and ends the processing sequence (step S1307).

The print management system 102 executes the following processes for the respective pages which form the print job (steps S1310 to S1318). The print management system 102 executes image processing for the page of interest (step S1311). Then, the print management system 102 determines whether an error exists in the content of the page of interest (step S1312). This error determination corresponds to determination of whether a data error exists. If no error exists (NO in step S1312), the print management system 102 performs image processing for all pages which form the print job unless an error exists in the page of interest. Then, the process advances to step S1319. After the end of image processing for all pages, the print management system 102 transfers the print job to the printer 103 to print. The processing sequence then ends.

If the print management system 102 detects a data error in the image content of the page of interest (YES in step S1312), it determines whether the page of interest is the first page (step S1313). If the page of interest on which the data error has been detected is the first page (NO in step S1313), the print management system 102 deletes the print job from the queue of the print management system 102 (step S1315). Then, the process advances to step S1316.

If the page of interest on which the data error has been detected is not the first page (YES in step S1313), the print job has already been issued to the printer 103. Hence, the print management system 102 adds the cancel reason to a job cancel command for the print job, and issues the job cancel command to the printer 103 (step S1314).

The print management system 102 notifies the order management system 101 at an upper level of the error event (step S1316). The print management system 102 displays the cancel reason ("data error" in this case) on the UI of the print management system 102, and ends the processing sequence (step S1317).

As described above, even in the arrangement described in the second embodiment, information about the reason why a print job has been canceled can be shared between the subsystems, similar to the first embodiment. In addition, displays in the respective subsystems can be made to match each other.

Third Embodiment

The third embodiment will exemplify cancel processing by a print management system 102 when the print management system 102 detects a job error during issuing of a job to a printer 103. In the first embodiment, the printer 103 switches the criterion of cancellation in accordance with print settings, as represented by step S1101 of FIG. 12A. In the third embodiment, the print management system 102 switches the criterion of cancellation in accordance with print settings. The overall arrangement of the system and the remaining common parts are the same as those in the first embodiment, and a description thereof will not be repeated.

[Print Form]

Figure 15:
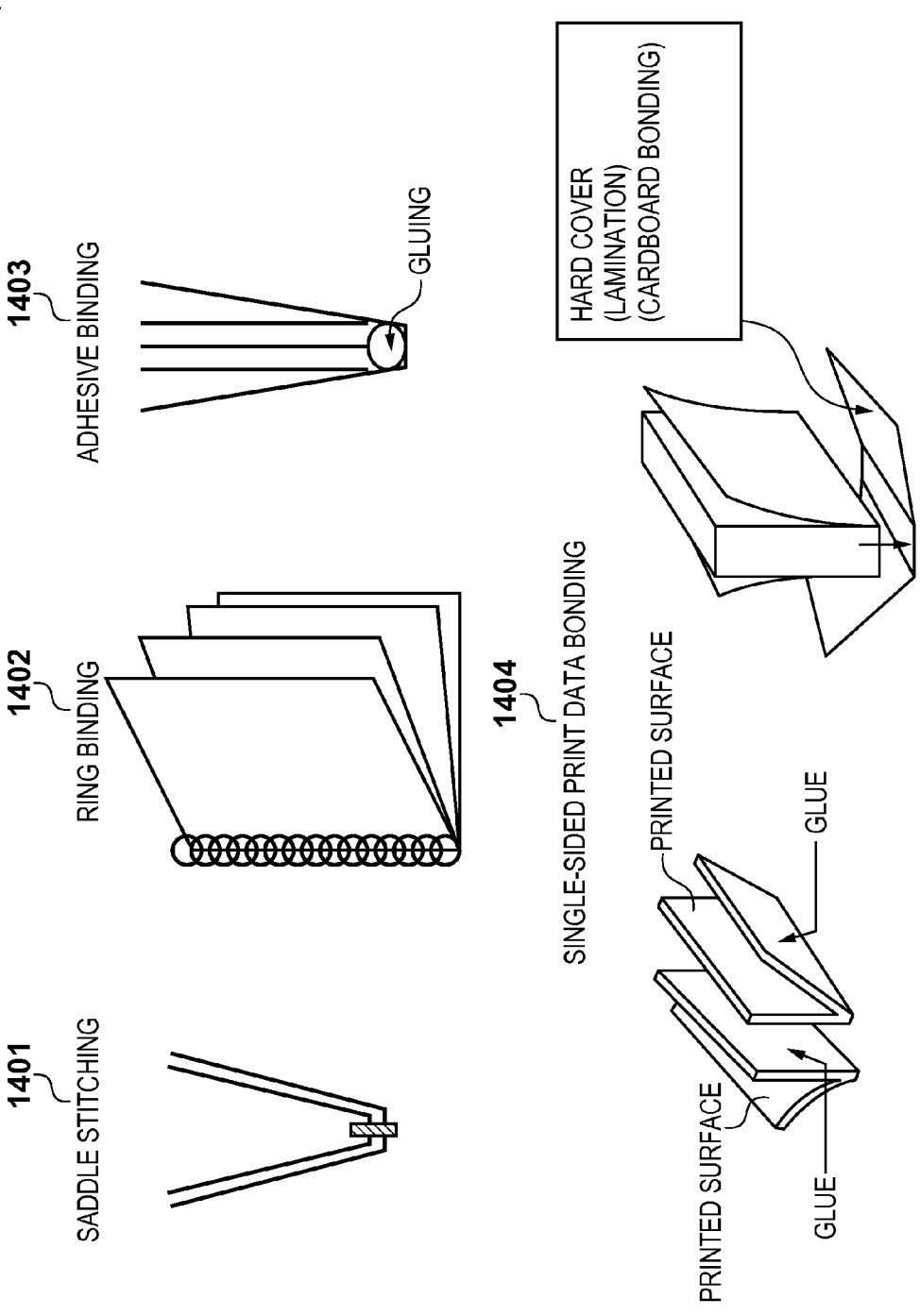
FIG. 15 is a view showing the print form of a book according to the third embodiment.

The print form will be explained with reference to FIG. 15. Examples of single sheet print forms are a photo print, card, calendar, collage, poster, and portrait. Examples of book print forms are saddle stitching 1401, ring binding 1402, adhesive binding 1403, and single-sided print data bonding 1404.

As an example of bookbinding by the saddle stitching 1401, double-sided print is performed, the three sides of the printed material are cut, and the printed material is stapled at the center. As an example of bookbinding by the ring binding 1402, a printed material having undergone single- or double-sided print is ring-bound. As an example of bookbinding by the adhesive binding 1403, a printed material having undergone double-sided print is glued as shown in FIG. 15, and the adhesive-bound body is wrapped with a cover. As an example of bookbinding by the single-sided print data bonding 1404, a body and cover is glued as shown in FIG. 15, and the bonded body is wrapped with a hard cover. The hard cover is prepared by lamination or cardboard bonding.

For example, a case in which a job is formed from four images (contents) and the print management system detects a job error or data error in the third image, as shown in FIG. 16, will be explained. At this time, when the print form of the print job is single sheet print, printable images are desirably printed. Thus, the print management system 102 keeps issuing the print job while skipping the page on which the error has been detected in the print job. The print management system 102 notifies an order management system 101 at an upper level via a predetermined API (Application Program Interface) that printing is partially successful. In this case, image data 1503 out of image data 1501, 1502, 1503, and 1504 is improper. The print management system 102 transfers job data of the image data 1501 and 1502 to the printer 103, skips the image data 1503, and then transfers job data of the image data 1504 to the printer 103.

When the print form of the print job is book print, the print form of a book is not completed if even a part cannot be printed. For this reason, when an error is detected in the print job, the print management system 102 issues a cancel command to cancel the issued print job upon detecting the error in the print job. The print management system 102 notifies the order management system 101 at an upper level via the predetermined API that the job error has occurred.

In this case, the image data 1503 out of the image data 1501, 1502, 1503, and 1504 is improper. When the print management system 102 confirms image impropriety of the image data 1503 upon transferring job data of the image data 1501 and 1502 to the printer 103, it cancels the print job and stops printing. That is, the print management system 102 cancels the print job of the image data 1501 and 1502 during printing, and does not transfer job data of the image data 1503 and 1504 to the printer 103.

In this manner, when performing job cancel processing in the print management system, cancel processing is changed depending on which of book print or single sheet print is designated as the print form. This can increase the efficiency in reprinting.

[Processing Sequence in Print Management System]

Figure 17:
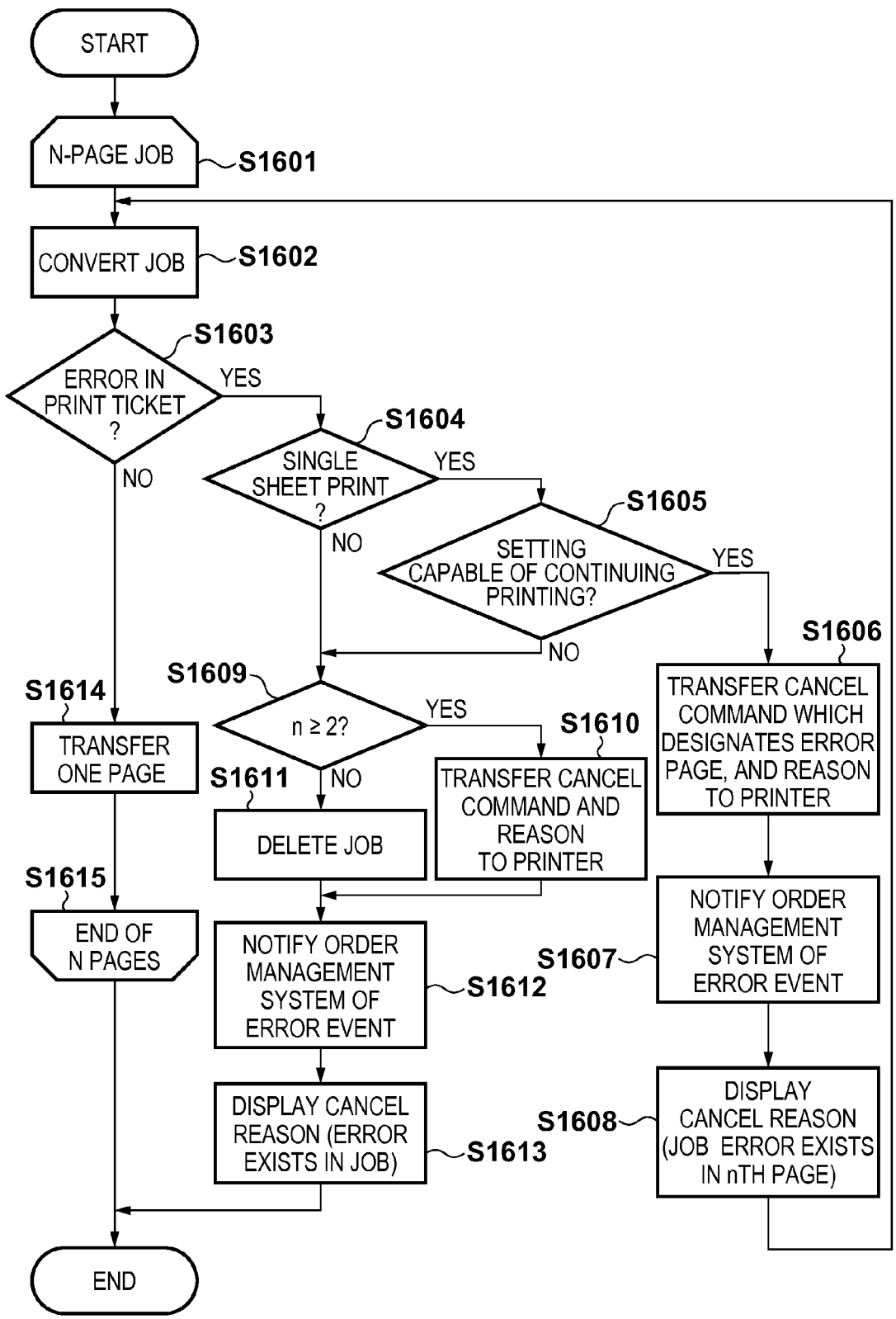
FIG. 17 is a flowchart showing the operation of a print management system which changes processing depending on the form of a printed product when a job error occurs in a print job according to the third embodiment.

The operation of the print management system when the print management system 102 detects a job error will be explained with reference to the flowchart of FIG. 17. Note that this processing is implemented by reading out a program held in a storage unit (not shown) and executing it by the CPU (not shown) of the print management system 102. In this case, a print job is formed from N pages, and the page of interest is described as the nth page.

The print management system 102 starts the processing upon receiving a print job of N pages from the order management system 101, and executes the following processes for the respective pages which form the print job (steps S1601 to S1615). The print management system 102 analyzes the page of interest in the print job, and converts the job (step S1602).

The print management system 102 determines whether an error exists in the print ticket in print ticket analysis of the print job (step S1603). If no error exists (NO in step S1603), the print management system 102 transfers the page of interest to the printer 103 (step S1614). The print management system 102 analyzes and converts all the pages which form the print job, and transfers them to the printer 103 unless an error occurs in the page of interest. Then, the processing sequence ends.

If an error exists in the print ticket (YES in step S1603), the print management system 102 determines whether the print job designates single sheet print (step S1604). If the print job does not designate single sheet print (NO in step S1604), the process advances to step S1609. If the print job designates single sheet print (YES in step S1604), the print management system 102 determines whether the setting can continue printing (step S1605). If the setting cannot continue printing (NO in step S1605), the process advances to step S1609. Printing cannot continue when, for example, an error is detected on the obverse surface in single-sheet double-sided print. In this case, the print management system 102 determines that printing should not continue for the page of interest on which the error has detected, and subsequent pages.

If printing can continue (YES in step S1605), the print management system 102 transfers a cancel command which designates the error page, and the cancel reason to the printer 103 to print the remaining pages except for the error page (step S1606). The following description is an example of adding the cancel reason to the cancel command which designates the error page when the error is detected in print ticket analysis of the third page:

<operation>ikw:CancelJob</operation>
    <vcn2:cancelreason>ikw:InvalidContentsData</vcn2:cancelreason>
    <vcn2:cancelpage>3</vcn2:cancelpage>

The print management system 102 notifies the order management system 101 at an upper level of the error event (step S1607). The print management system 102 displays the cancel reason ("job error" or "data error" in this case) on the UI (step S1608). The process returns to step S1602, and the print management system 102 continues image processing for subsequent pages.

In step S1609, the print management system 102 determines whether an error has been detected in analysis of the first page. If an error has been detected in the print ticket in analysis of the first page (NO in step S1609), the print management system 102 deletes the print job from the queue, and cancels issuing of the print job (step S1611). The process then advances to step S1612.

If an error has been detected in the print ticket in analysis of the second or subsequent page (YES in step S1609), the print job has already been issued to the printer 103. Thus, the print management system 102 adds the cancel reason to a job cancel command for the print job, and issues the job cancel command to the printer 103 (step S1610).

The print management system 102 notifies the order management system 101 at an upper level of the error event (step S1612). The print management system 102 displays the page number and cancel reason ("job error on the nth page" in this case) on the UI of the print management system 102 (step S1613). Then, the processing sequence ends.

[Processing Sequence in Printer]

Figure 18:
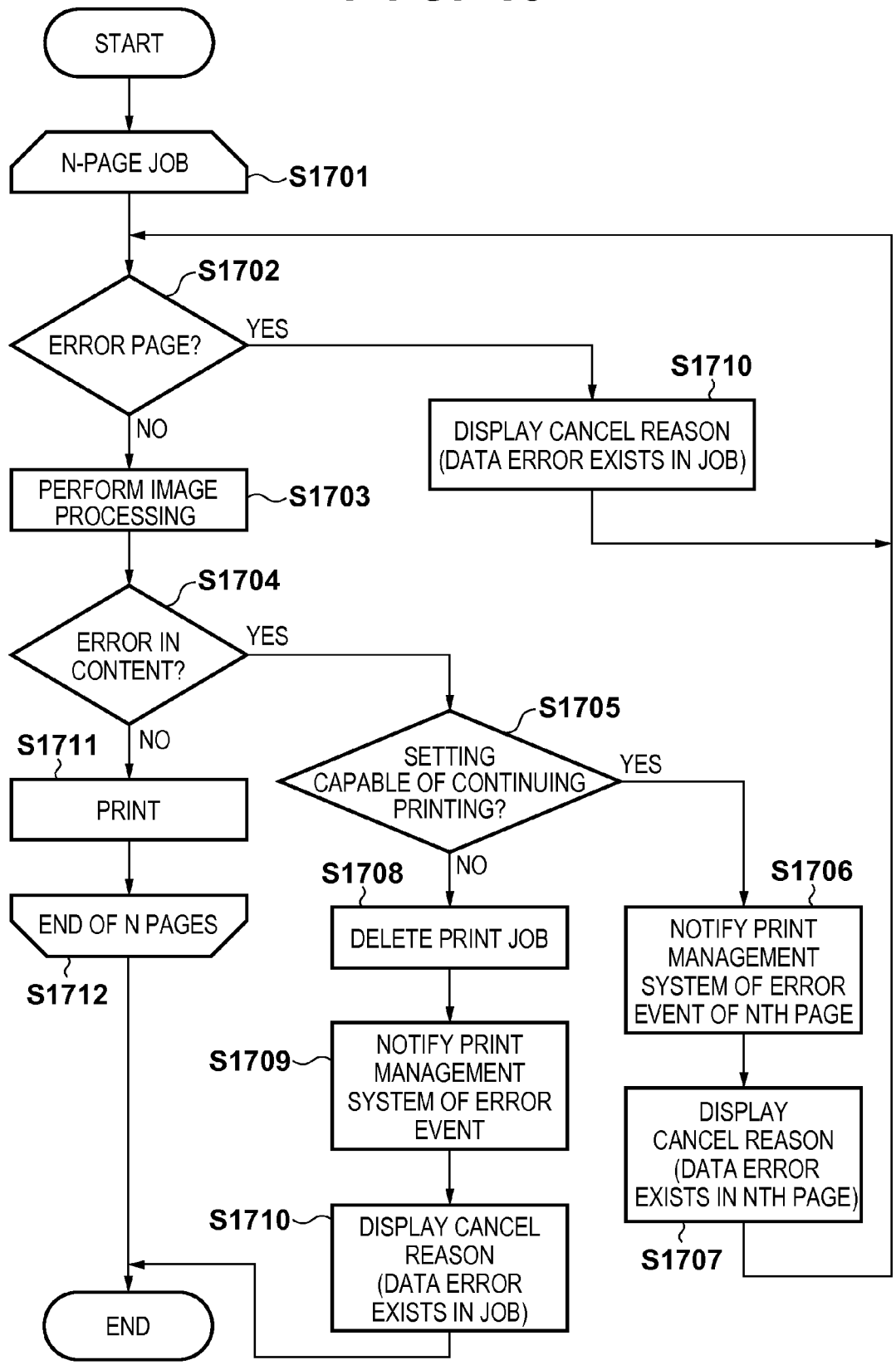
FIG. 18 is a flowchart showing the operation of a printer which changes processing depending on the form of a printed product when a job error occurs in a print job according to the third embodiment.

The operation of the printer upon receiving a cancel command which designates an error page, and a cancel reason from the print management system 102 will be described with reference to the flowchart of FIG. 18. Note that this processing is implemented by reading out a program held in a storage unit (not shown) and executing it by the CPU (not shown) of the printer 103. In this case, a print job is formed from N pages, and the page of interest is described as the nth page.

The printer 103 starts processing upon receiving a print job of N pages from the print management system 102, and executes the following processes for the respective pages which form the print job (steps S1701 to S1712). The printer 103 determines whether the page of interest is an error page designated in step S1606 of FIG. 17 (step S1702). If the page of interest is an error page (YES in step S1702), the printer 103 advances to step S1710. The printer 103 skips the page of interest, and displays the cancel reason ("job error on the nth page" in this case) on the UI of the printer 103 (step S1710). The process returns to step S1702 to set the next page as the page of interest. If the page of interest is not an error page (NO in step S1702), the printer 103 executes image processing for the page of interest (step S1703).

The printer 103 determines whether an error has been detected in content data in image processing (step S1704). If no error exists in the content data (NO in step S1704), the printer 103 prints the page of interest (step S1711). The printer 103 prints unless a content error occurs in each page of the print job. The printer 103 displays the completion of the print job on the UI, and ends the processing sequence.

If it is detected that an error exists in the content data (YES in step S1704), the printer 103 determines whether the setting can continue printing (step S1705). If the setting can continue printing without any problem (YES in step S1705), the printer 103 notifies the print management system 102 at an upper level of an error event representing that the error has occurred in the target page (step S1706). The printer 103 displays the cancel reason ("data error on the nth page" in this case) on the UI of the printer 103 (step S1707). The process returns to step S1702, and the printer 103 continues image processing for subsequent pages.

If printing cannot continue (NO in step S1705), the printer 103 deletes the received print job (step S1708). The printer 103 notifies the print management system 102 at an upper level of an error event representing that the data error has occurred (step S1709). The printer 103 displays the cancel reason ("data error on the nth page" in this case) on the UI of the printer 103 (step S1710). Thereafter, the processing sequence ends.

Even when the criterion of cancellation for a print job is switched based on the print form, information about the reason why the print job has been canceled can be shared between the subsystems. Further, displays in the respective subsystems can be made to match each other.

In the third embodiment, the setting referred to when switching the criterion (determination processing) is the form setting (single sheet print/book print) of a print job. However, the present invention is not limited to this setting, and the criterion may be switched by referring to another print setting.

Determination of whether the setting can continue printing may use another condition in accordance with matching of print settings.

Fourth Embodiment

The fourth embodiment will describe an example of adding an action to a cancel command to designate the operation of a printer 103 when a print management system 102 detects a job error during issuing of a print job to the printer 103. The overall arrangement of the system and the remaining common parts are the same as those in the first embodiment, and a description thereof will not be repeated.

The operation of the print management system 102 is almost the same as that in the flowchart of FIG. 8. In the first embodiment, the print management system 102 adds a cancel reason to a job cancel command, and transfers the job cancel command (step S705). In the fourth embodiment, an action instruction is added instead of a cancel reason.

In the fourth embodiment, when the print form is book print and a job error is detected, the print management system 102 issues, as an action instruction, a charging stop instruction regarding the print job to the printer 103. This can prevent charging of an unexecuted print job. As another example of the action instruction, when a job error occurs under a given condition, the printer 103 may be turned off. FIG. 4C exemplifies a cancel command to which the action of the charging stop instruction is added according to the fourth embodiment.

Also, the operation of the printer 103 according to the fourth embodiment is almost the same as that in the flowchart of FIG. 11 described in the first embodiment. In the first embodiment, the printer 103 displays a cancel reason ("job error" in this case) to the UI (step S1006). In the fourth embodiment, the printer 103 executes processing according to an action instruction contained in a cancel command.

In FIG. 4C, an action instruction is added in place of a cancel reason. However, the present invention is not limited to this, and both kinds of information may be added.

The printer 103 can execute an action corresponding to an error to stop, for example, charging of a print job in which a job error has occurred.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-232124, filed Oct. 21, 2011, which is hereby incorporated by reference herein in its entirety.

What is claimed is:

1. An information processing apparatus which transfers a print job to an image forming apparatus, comprising a computer configured to function as:
   a detection unit configured to detect a cancel reason from content of the print job;
   a cancel command issuing unit configured, if the cancel reason is detected, to issue, to the image forming apparatus, a cancel command to which information based on the cancel reason is added;
   a determination unit configured, if the cancel reason is detected, to determine whether or not a page of interest is a first page; and
   a deletion unit configured, if the determination unit determines that a page of interest is a first page, to delete the print job,
   wherein the information based on the cancel reason is displayed on the image forming apparatus, and
   wherein if the determination unit determines that a page of interest is not a first page, the cancel command issuing unit issues the cancel command.

2. The information processing apparatus according to claim 1, wherein the information based on the cancel reason represents that data impropriety exists in the print job.

3. The information processing apparatus according to claim 2, wherein the data impropriety arises from a print setting of the print job.

4. The information processing apparatus according to claim 2, wherein the data impropriety arises from print data of the print job.

5. The information processing apparatus according to claim 4, wherein the computer is further configured to function as a reception unit configured, when the print job is canceled in the image forming apparatus, to receive the information based on the cancel reason as job status information from the image forming apparatus.

6. The information processing apparatus according to claim 1, wherein the information based on the cancel reason represents that a user cancels the print job.

7. The information processing apparatus according to claim 1, wherein the computer is further configured to function as a notification unit configured, when another information processing apparatus, which transfers the print job to the information processing apparatus, exists in a print system, to notify the another information processing apparatus of the information based on the cancel reason.

8. The information processing apparatus according to claim 1, wherein the cancel command issuing unit adds, to the cancel command together with the information based on the cancel reason, an action instruction to perform processing other than cancellation.

9. The information processing apparatus according to claim 1, wherein the computer is further configured to function as a display unit configured to display the information based on the cancel reason.

10. A method of controlling an information processing apparatus which transfers a print job to an image forming apparatus, comprising:
    detecting a cancel reason from content of the print job;
    issuing, if the cancel reason is detected, to the image forming apparatus, a cancel command to which information based on the cancel reason is added;
    determining, if the cancel reason is detected, whether or not a page of interest is a first page; and
    deleting the print job, if it is determined that a page of interest is a first page in the determining,
    wherein the information based on the cancel reason is displayed on the image forming apparatus, and
    wherein if in the determining, it is determined that a page of interest is not a first page, the cancel command is issued in the issuing.

11. A non-transitory computer-readable medium storing a program for causing a computer to function as:
    a detection unit configured to detect a cancel reason from content of a print job;
    a cancel command issuing unit configured, if the cancel reason is detected, to issue, to an image forming apparatus, a cancel command to which information based on the cancel reason is added;
    a determination unit configured, if the cancel reason is detected, to determine whether or not a page of interest is a first page; and
    a deletion unit configured, if the determination unit determines that a page of interest is a first page, to delete the print job, wherein the information based on the cancel reason is displayed on the image forming apparatus, and wherein if the determination unit determines that a page of interest is not a first page, the cancel command issuing unit issues the cancel command.

* * * * *